*(12)* United States Patent
Kim

(10) Patent No.: US 11,429,180 B2
(45) Date of Patent: Aug. 30, 2022

(54) TRAINED MODEL CREATION METHOD FOR PERFORMING SPECIFIC FUNCTION FOR ELECTRONIC DEVICE, TRAINED MODEL FOR PERFORMING SAME FUNCTION, EXCLUSIVE CHIP AND OPERATION METHOD FOR THE SAME, AND ELECTRONIC DEVICE AND SYSTEM USING THE SAME

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/366,042

(22) Filed: Jul. 2, 2021

(65) Prior Publication Data

US 2021/0373646 A1 Dec. 2, 2021

Related U.S. Application Data

(63) Continuation of application No. PCT/KR2019/012420, filed on Sep. 24, 2019.

(30) Foreign Application Priority Data

Jan. 4, 2019 (KR) .................. 10-2019-0001406
Jan. 8, 2019 (KR) .................. 10-2019-0002220

(51) Int. Cl.
*G06F 1/00* (2006.01)
*G06F 1/3287* (2019.01)
(Continued)

(52) U.S. Cl.
CPC .......... *G06F 1/3287* (2013.01); *G06F 1/3206* (2013.01); *G06K 9/6256* (2013.01); *G06N 3/08* (2013.01)

(58) Field of Classification Search
CPC ... G06F 1/3287; G06F 1/3206; G06K 9/6256; G06N 3/08
See application file for complete search history.

(56) References Cited

U.S. PATENT DOCUMENTS 6,496,107 B1 12/2002 Himmelstein
10,665,070 B1 * 5/2020 Picardi .................. G06N 3/08
(Continued)

FOREIGN PATENT DOCUMENTS

JP 2017-206183 A 11/2017
KR 10-2005-0061975 A 6/2005
(Continued)

*Primary Examiner* — Xuxing Chen
(74) *Attorney, Agent, or Firm* — Invenstone Patent, LLC

(57) ABSTRACT

A trained model creation method for performing a specific function for an electronic device includes preparing big data for training an artificial neural network and specific function performance determination data for determining whether to perform a specific function of an electronic device with respect to the sensing data; and preparing an artificial neural network model, which calculates inputs of the sensing data for the nodes of the input layer in order to output the specific function performance determination data from the nodes of the output layer. The artificial neural network model is trained by repeatedly performing a process of inputting the sensing data included in the prepared big data into the nodes of the input layer and outputting the specific function performance determination data that pairs with the sensing data included in the big data from the nodes of the output layer so as to update the association parameters.

10 Claims, 11 Drawing Sheets

(51) Int. Cl.
    *G06F 1/3206*    (2019.01)
    *G06K 9/62*       (2022.01)
    *G06N 3/08*       (2006.01)

(56) References Cited

U.S. PATENT DOCUMENTS

| | | | |
|---|---|---|---|
| 2012/0007713 A1* | 1/2012 | Nasi | A63F 13/30 |
| | | | 340/5.81 |
| 2016/0171976 A1 | 6/2016 | Sun et al. | |
| 2017/0206895 A1 | 7/2017 | Tang | |
| 2017/0332035 A1 | 11/2017 | Shah et al. | |
| 2019/0147855 A1* | 5/2019 | Zhao | G10L 15/142 |
| | | | 704/232 |
| 2020/0219616 A1* | 7/2020 | Swift | G06N 20/00 |
| 2020/0278738 A1* | 9/2020 | Madar, III | G06N 3/063 |

FOREIGN PATENT DOCUMENTS

| | | |
|---|---|---|
| KR | 10-2013-0133026 A | 12/2013 |
| KR | 10-2015-0035312 A | 4/2015 |
| KR | 10-2017-0091903 A | 8/2017 |
| KR | 10-2018-0019347 A | 2/2018 |
| KR | 10-2018-0106619 A | 10/2018 |
| KR | 10-2018-0119042 A | 11/2018 |

\* cited by examiner

| | SENSING DATA | SPECIFIC FUNCTION PERFORMANCE DETERMINATION |
|---|---|---|
| 1 | FIRST SENSING DATA (BS1-1,BS1-2,BS1-3,BS1-4) | FIRST SPECIFIC FUNCTION PERFORMANCE DETERMINATION(o) |
| 2 | SECOND SENSING DATA (BS2-1,BS2-2,BS2-3,BS2-4) | SECOND SPECIFIC FUNCTION PERFORMANCE DETERMINATION(x) |
| 3 | THIRD SENSING DATA (BS3-1,BS3-2,BS3-3,BS3-4) | THIRD SPECIFIC FUNCTION PERFORMANCE DETERMINATION(x) |
| ... | ... | ... |
FIG. 1B
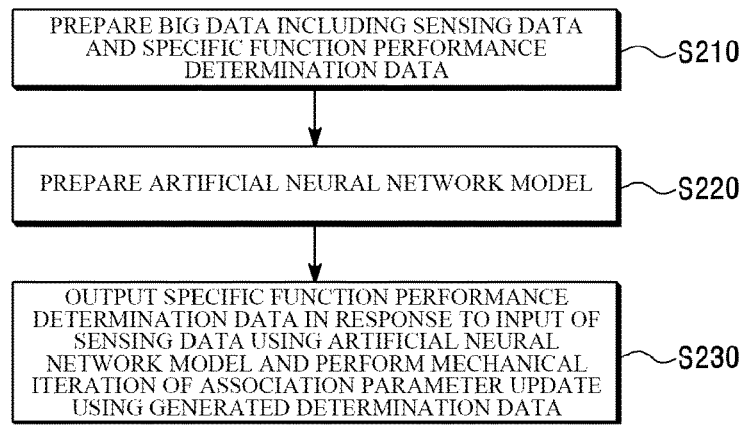
FIG. 2
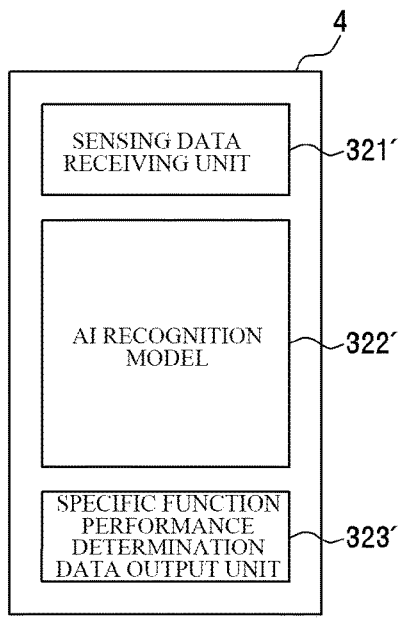
FIG. 3

(a)

(b)

_US 11,429,180 B2_

TRAINED MODEL CREATION METHOD FOR PERFORMING SPECIFIC FUNCTION FOR ELECTRONIC DEVICE, TRAINED MODEL FOR PERFORMING SAME FUNCTION, EXCLUSIVE CHIP AND OPERATION METHOD FOR THE SAME, AND ELECTRONIC DEVICE AND SYSTEM USING THE SAME

CROSS-REFERENCE TO RELATED APPLICATIONS

This application is a continuation of International Application No. PCT/KR2019/012420, filed on Sep. 24, 2019, which claims the benefit of priority to Korean Application(s) No. 10-2019-0001406, filed on Jan. 4, 2019 and No. 10-2019-0002220, filed on Jan. 8, 2019 in the Korean Intellectual Property Office.

BACKGROUND OF THE DISCLOSURE

Technical Field

The present disclosure relates to a trained model creation method for performing a specific function for an electronic device, a trained model for performing a specific function for an electronic device, a dedicated chip for performing a specific function for an electronic device, an operation method for a dedicated chip for performing a specific function for an electronic device, an electronic device having a function of performing a specific function, and a system for performing a specific function of an electronic device, and more particularly, to a trained model creation method for performing a specific function for an electronic device, a trained model for performing a specific function for an electronic device, a dedicated chip for performing a specific function for an electronic device, an operation method for a dedicated chip for performing a specific function for an electronic device, an electronic device having a function of performing a specific function, and a system for performing a specific function of an electronic device for performing a specific function, which is fast and accurate, using a model which is trained in advance using an artificial neural network for an electronic device.

BACKGROUND ART

In the case of an electronic device such as a smart phone, power for all the unused hardware components is turned on even when the user does not use them, thereby a lot of power consumption is caused.

To solve this problem, there has been an effort to reduce unnecessary power consumption by turning off the power for the unused hardware components when the user does not use them.

In spite of this effort, according to a specific function performing system of a contemporary art, there is a technical limit in that a sensor cannot precisely recognize sensing data so that a specific function is performed in a situation in which the sensing data does not need to be sensed or a specific function is not performed even in a situation in which the sensing data needs to be sensed.

SUMMARY OF THE DISCLOSURE

The present disclosure is directed to solving the above-mentioned problem and an object of the present disclosure is to perform a specific function in an exact situation intended by a user by precisely understanding the sensing data.

Further, an object is to more quickly and precisely output determination data of a specific function to be performed, by inputting sensing data to an AI recognition model.

Further, an object is to promote the convenience of users only by performing an inference process by an AI recognition model without performing separate learning whenever real-time sensing data is inputted, using a previously trained AI recognition model to output determination data of a specific function to be performed.

Finally, it is advantageous in that the power is not always turned on, but the system is driven only when specific sensing data is received to reduce power consumption.

One aspect of the present disclosure provides a trained model creation method for performing a specific function for an electronic device, including: preparing big data for training an artificial neural network including, in pairs, sensing data received from a random sensing data generation unit for sensing human behaviors and determination data of performing specific function for determining whether to perform a specific function of an electronic device with respect to the sensing data; preparing an artificial neural network model, which includes nodes of an input layer through which the sensing data is inputted, nodes of an output layer through which the determination data of performing specific function of the electronic device is outputted, and associated parameters between the nodes of the input layer and the nodes of the output layer and calculates inputs of the sensing data for the nodes of the input layer in order to output the determination data of performing specific function from the nodes of the output layer; and repeatedly performing a process of inputting the sensing data included in the prepared big data into the nodes of the input layer and outputting the determination data of performing specific function that pairs with the sensing data included in the big data from the nodes of the output layer so as to update the associated parameters, thereby mechanically training the artificial neural network model.

Another aspect of the present disclosure provides a trained model for performing a specific function for an electronic device which is acquired by mechanically training an artificial neural network model, which includes nodes of an input layer through which the sensing data is inputted, nodes of an output layer through which the determination data of performing specific function is outputted, and associated parameters between the nodes of the input layer and the nodes of the output layer and calculates inputs of the sensing data for the nodes of the input layer in order to output the determination data of performing specific function from the nodes of the output layer, by repeatedly performing a process of inputting the sensing data included in the big data into the nodes of the input layer and outputting the determination data of performing specific function that pairs with the sensing data included in the big data from the nodes of the output layer so as to update the associated parameters, using big data for training an artificial neural network including, in pairs, sensing data received from a random sensing data generation unit for sensing human behaviors and determination data of performing specific function for determining whether to perform a specific function of an electronic device with respect to the sensing data.

Another aspect of the present disclosure provides a dedicated chip for performing a specific function for an electronic device, including: a sensing data receiving unit which receives sensing data for sensing human behaviors from at least one sensing data generation unit; a determination data of performing specific function output unit which outputs determination data of performing specific function for determining whether to perform a specific function of the electronic device including the at least one sensing data generation unit by matching the sensing data; and an artificial intelligence (AI) recognition model which outputs the determination data of performing specific function in response to the input of the sensing data, in which in the AI recognition model, a trained model is embedded, the trained model is generated using an artificial neural network model, which includes nodes of an input layer through which the sensing data is inputted, nodes of an output layer through which the determination data of performing specific function is outputted, and associated parameters between the nodes of the input layer and the nodes of the output layer and calculates inputs of the sensing data for the nodes of the input layer in order to output the determination data of performing specific function from the nodes of the output layer, and the associated parameters are updated by repeatedly performing a process of inputting the sensing data included in the big data into the nodes of the input layer and outputting the determination data of performing specific function included in the big data that pairs with the sensing data included in the big data from the nodes of the output layer to mechanically train the artificial neural network model.

Another aspect of the present disclosure provides a driving method of a dedicated chip for performing a specific function for an electronic device, including: receiving sensing data for sensing human behaviors from at least one sensing data generation unit; and outputting determination data of performing specific function for determining whether to perform a specific function of the electronic device including the at least one sensing data generation unit by matching the sensing data using an AI recognition model, in which the AI recognition model is configured such that a trained model is embedded in a dedicated chip of performing a specific function, the trained model includes nodes of an input layer through which the sensing data is inputted, nodes of an output layer through which the determination data of performing specific function is outputted, and associated parameters between the nodes of the input layer and the nodes of the output layer, and is generated using an artificial neural network model which outputs the determination data of performing specific function from the nodes of the output layer in response to input of the sensing data for the nodes of the input layer, and the associated parameters are updated by repeatedly performing a process of inputting the sensing data into the nodes of the input layer and outputting the determination data of performing specific function that pairs with the sensing data from the nodes of the output layer to mechanically train the artificial neural network model.

Another aspect of the present disclosure provides an electronic device, including: at least one sensing data generation unit which generates sensing data for sensing human behaviors; a processor which outputs determination data of performing specific function to determine whether to perform a specific function of the electronic device by matching the sensing data received from the at least one sensing data generation unit; and a control unit which receives a signal to perform a specific function generated based on the determination data of performing specific function from the processor to generate a driving command to drive the electronic device, in which the processor includes an artificial intelligence (AI) recognition model to output the determination data of performing specific function in response to the input of the sensing data, In the AI recognition model, a trained model is embedded, and the trained model is generated using an artificial neural network model, which includes nodes of an input layer through which the sensing data is inputted, nodes of an output layer through which the determination data of performing specific function is outputted, and associated parameters between the nodes of the input layer and the nodes of the output layer, and outputs the determination data of performing specific function from the nodes of the output layer in response to the input of the sensing data for the nodes of the input layer, and the associated parameters are updated by repeatedly performing a process of inputting the sensing data included in the big data into the nodes of the input layer and outputting the determination data of performing specific function included in the big data that pairs with the sensing data included in the big data from the nodes of the output layer to mechanically train the artificial neural network model.

Another aspect of the present disclosure provides a driving method of an electronic device, including: generating sensing data for sensing human behaviors, in at least one sensing data generation unit; outputting determination data of performing specific function to determine whether to perform a specific function of the electronic device by matching the sensing data received from the at least one sensing data generation unit, through an AI recognition model embedded in the electronic device, in a processor, generating a signal to perform a specific function based on the determination data of performing specific function, in the processor; and generating a driving command to drive the electronic device by receiving the signal to perform a specific function from the processor, in a control unit, in which, in the AI recognition model, a trained model is embedded in the electronic device, and the trained model is generated using an artificial neural network model, which includes nodes of an input layer through which the sensing data is inputted, nodes of an output layer through which the determination data of performing specific function is outputted, and associated parameters between the nodes of the input layer and the nodes of the output layer, and outputs the determination data of performing specific function from the nodes of the output layer in response to the input of the sensing data for the nodes of the input layer, and the associated parameters are updated by repeatedly performing a process of inputting the sensing data included in the big data into the nodes of the input layer and outputting the determination data of performing specific function included in the big data that matches the sensing data included in the big data from the nodes of the output layer to mechanically train the artificial neural network model.

Another aspect of the present disclosure provides an electronic device which communicates with a server, including: at least one sensing data generation unit which generates sensing data for sensing human behaviors; a processor which receives the sensing data from the sensing data generation unit; a communication unit which transmits the sensing data received from the processor to the server; a control unit which generates a control command to control the electronic device; and a second function unit which is driven based on the control command, in which the server outputs determination data of performing specific function for determining whether to perform a specific function of the electronic device by matching the sensing data through an artificial intelligence (AI) recognition model, in the AI recognition model, a trained model is embedded in the server, the trained model is generated using an artificial neural network model, which includes nodes of an input layer through which the sensing data is inputted, nodes of an output layer through which the determination data of performing specific function is outputted, and associated parameters between the nodes of the input layer and the nodes of the output layer, and outputs the determination data of performing specific function from the nodes of the output layer in response to the input of the sensing data for the nodes of the input layer, and the associated parameters are updated by repeatedly performing a process of inputting the sensing data included in the big data into the nodes of the input layer and outputting the determination data of performing specific function included in the big data that pairs with the sensing data included in the big data from the nodes of the output layer to mechanically train the artificial neural network model, the processor receives the determination data of performing specific function from the server to generate a signal to perform a specific function based on the determination data of performing specific function, the control unit generates a driving command to drive the second function unit, based on the signal to perform a specific function received from the processor, and the second function unit is driven based on the driving command.

According to an exemplary embodiment of the present disclosure, sensing data is precisely understood to perform a specific function in an exact situation intended by a user.

Further, the sensing data is inputted to an AI recognition model to output faster and more exact determination data of a specific function to be performed.

Further, the convenience of users may be promoted only by performing an inference process by means of an AI recognition model, without performing a separate learning whenever real-time sensing data is inputted, using a previously trained AI recognition model to output determination data of a specific function to be performed.

Finally, it is advantageous in that power is not always turned on and that, to reduce power consumption, the system is driven only when specific sensing data is received.

BRIEF DESCRIPTION OF THE DRAWINGS

FIG. 1B is a view referenced to explain a combination of sensing data and determination data of performing specific function.

FIG. 2 is a flowchart for explaining a trained model creation method for performing a specific function for an electronic device according to an exemplary embodiment of the present disclosure.

FIG. 3 is a block diagram for explaining a performing specific function determination dedicated chip or dedicated system according to an exemplary embodiment of the present disclosure.

DETAILED DESCRIPTION OF THE DISCLOSURE

Figure 1A:
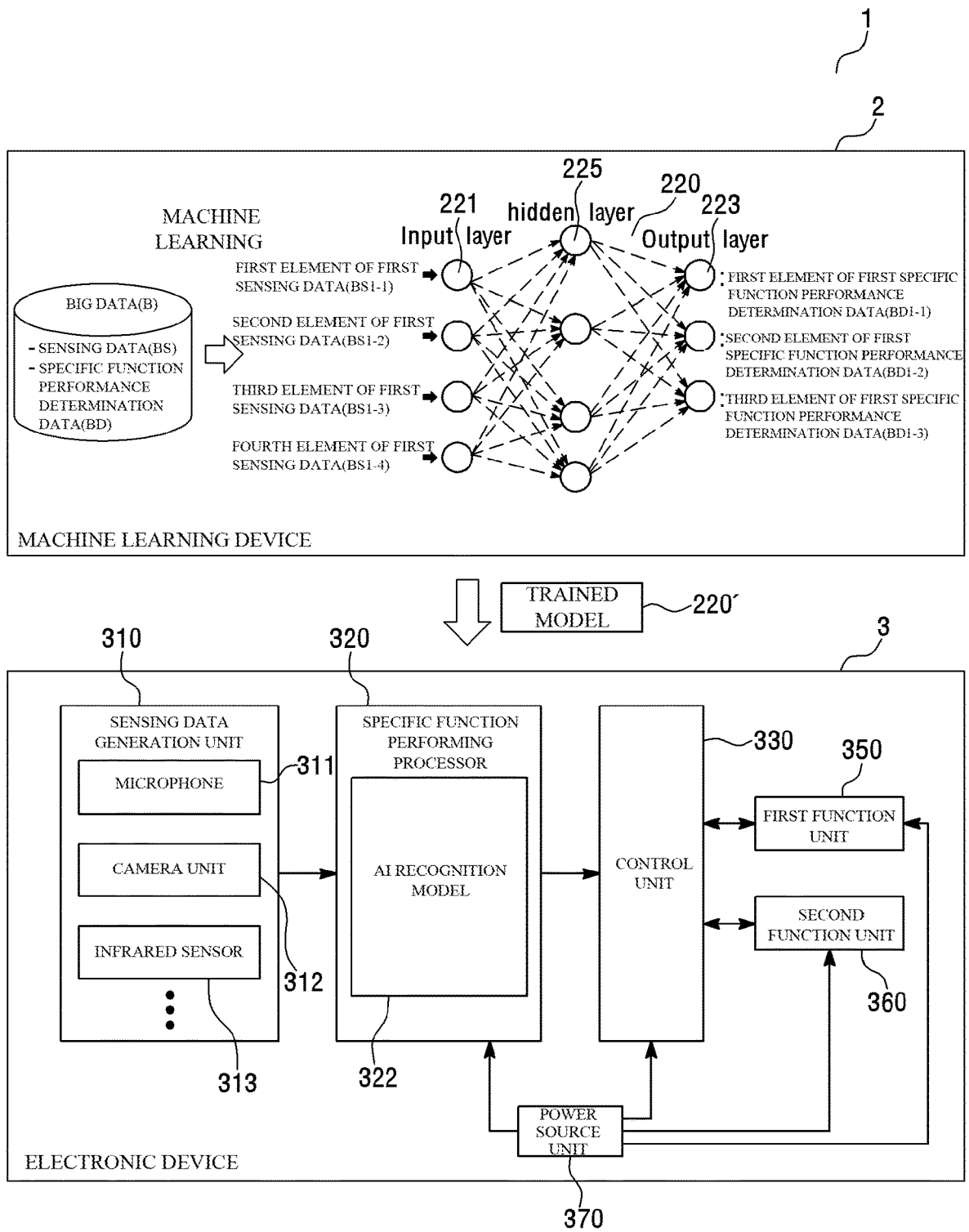
FIG. 1A is a conceptual view for explaining a system for performing a specific function of an electronic device based on an artificial neural network according to an exemplary embodiment of the present disclosure.

The present disclosure will be described in detail with reference to the accompanying drawings based on a specific exemplary embodiment in which the present disclosure may be carried out as an example. The exemplary embodiment will be described in detail enough to carry out the present disclosure by those skilled in the art. It should be understood that various exemplary embodiments of the present disclosure are different from each other, but need not be mutually exclusive. For example, a specific figure, a structure, and a characteristic described herein may be implemented as another exemplary embodiment without departing from a spirit and a scope of the present disclosure in relation to an exemplary embodiment. Further, it should be understood that a position or a placement of an individual element in each disclosed exemplary embodiment may be changed without departing from the spirit and the scope of the present disclosure. Accordingly, a detailed description below is not taken as a limited meaning, and the scope of the present disclosure is defined only by the accompanying claims together with all equivalent scopes to the claims if the scope of the present disclosure is appropriately described. Like reference numerals in the drawing denote the same or similar function throughout several aspects.

Embodiment 1 (Electronic Device which Performs Specific Function Based on Sensing Information about Human Behavior)

Example 1-1 System for Performing Specific Function of Electronic Device Based on Artificial Neural Network (FIG. 1A)

Hereinafter, a specific function performing system of an electronic device based on an artificial neural network according to an exemplary embodiment of the present disclosure will be described with reference to the accompanying drawings.

FIG. 1A is a conceptual view for explaining a system 1 for performing a specific function of an electronic device based on an artificial neural network according to an exemplary embodiment of the present disclosure.

As illustrated in FIG. 1A, the system 1 for performing a specific function of an electronic device based on an artificial neural network may include a machine learning device 2 and an electronic device 3.

The machine learning device 2 performs machine learning on an artificial neural network model 220 using big data B to generate a trained model 220'. Specifically, the big data B and the artificial neural network model 220 are prepared and the artificial neural network model 220 is repeatedly mechanically trained using the big data B to generate the trained model 220'.

The big data B according to the exemplary embodiment of the present disclosure may include sensing data BS and determination data of performing specific function BD. The sensing data BS is data generated from a random sensing data generation unit and may include voice information, proximity information, image information, and position information, but is not limited thereto in the present exemplary embodiment. The determination data of performing specific function BD may be prepared in advance to be paired with the sensing data BS to determine whether to perform a specific function of the electronic device 3.

The artificial neural network model 220 according to the exemplary embodiment of the present disclosure may include nodes 221 of an input layer through which the sensing data BS is inputted, nodes 223 of an output layer through which the determination data of performing specific function BD is outputted, and nodes 225 of a hidden layer between the nodes 221 of the input layer and the nodes 223 of the output layer, and a plurality of associated parameters (or weights) between the nodes 223 of the output layer and the nodes 221 of the input layer.

The nodes 221 of the input layer are nodes which configure the input layer and receive predetermined input data from the outside and the nodes 223 of the output layer are nodes which configure the output layer and output predetermined output data to the outside. The hidden nodes 225 disposed between the nodes 221 of the input layer and the nodes 223 of the output layer are nodes which configure the hidden layer and connect the output data of the nodes 221 of the input layer to the input data of the nodes 223 of the output layer. Though FIG. 1A shows only one hidden layer, according to an exemplary embodiment, there may be a plurality of hidden layers, for example, two or four or more hidden layers, disposed between the input layer and the output layer to implement a deep artificial neural network.

Each node 221 of the input layer may be fully connected or incompletely connected to the nodes 223 of the output layer, as illustrated in FIG. 1A, depending on a structure of the artificial neural network model.

The nodes 221 of the input layer serve to receive and calculate input data from the outside and then transmit a result value to the hidden node 225. The hidden node 225 also calculates the transmitted data and then transmits the result value to a next hidden layer or output layer. Finally, data transmitted to the output layer node becomes output data of the entire artificial neural network. When the calculation between the layers of the artificial neural network is performed, a predetermined associated parameter (or a weight w) is multiplied with input data which is inputted to a node of the corresponding layer to perform the calculation. After adding all result values (weighted sum) of a calculation performed in each node (usually, a matrix product or a convolution product is used), predetermined output data is generated by passing through a predetermined activation function and then transmitted to a next layer.

The activation function may usually use one of a step function, a sign function, a linear function, a logistic sigmoid function, a hyper tangent function, a ReLU function, and a softmax function. The activation function is appropriately selected when a structure of an artificial neural network model suitable for an application field is designed.

The artificial neural network is machine-trained by a process of repeatedly updating (or modifying) all associated parameters w in the neural network to an appropriate value. The machine learning method of the artificial neural network representatively includes supervised learning and unsupervised learning.

The supervised learning is a learning method of updating associated parameters w to make output data obtained by inputting the input data into the neural network similar to target data in a state in which target output data which is desired to be calculated for input data by an arbitrary neural network is clearly defined. The multilayered structure of FIG. 1A is generated based on the supervised learning.

The unsupervised learning is a learning method that outputs consistent output data for similar input data without defining target data to be calculated for input data by an arbitrary neural network. A representative neural network which performs the unsupervised learning includes a self-organizing feature map (SOM) and a Boltzmann machine.

Referring to FIG. 1A again, sensing data BS included in the big data B is inputted to the input layer of the artificial neural network model 220.

For example, when first sensing data BS1 is inputted to the input layer, first element to fourth element BS1-1 to BS1-4 which configure the first sensing data BS1 are inputted to nodes 221 of four input layers of the input layer, respectively, and first element to third element BD1-1 to BD1-3 which configure first determination data of performing specific function BD1 may be outputted from nodes 223 of three output layers of the output layer, respectively. Here, an output of the node of one output layer may include information indicating whether to perform one specific operation. For example, the number of nodes of an output layer including information indicating whether to apply an entire system power is one, and the value may be represented by 0 and 1. However, as described above, the scope of the present disclosure is not limited to the number of nodes 221 of the input layer and nodes 223 of the output layer illustrated in FIG. 1A.

Second sensing data BS2 and third sensing data BS3 may also be inputted to the input layer by the similar/same method as the input method of the first sensing data BS1 and second determination data of performing specific function BD2 and third determination data of performing specific function BD3 may be outputted by the similar/same method as the output method of the first determination data of performing specific function BD1.

A combination of the sensing data BS and the determination data of performing specific function BD will be described with reference to FIG. 1B. For example, the first determination data of performing specific function BD1 corresponding to the first sensing data BS1 is outputted to indicate a state in which performing specific function is available (o), and the second determination data of performing specific function BD2 corresponding to the second sensing data BS2 and the third determination data of performing specific function BD3 corresponding to the third sensing data BS3 may be outputted to indicate a state in which performing specific function is not available (x).

As described above, the machine learning device 2 consistently and repeatedly performs a process of inputting the sensing data BS into the nodes 221 of the input layer which configure the artificial neural network model 220 and outputting determination data of performing specific function BD from the nodes 223 of the output layer and performs machine learning to update an associated parameter w during this process to train the artificial neural network model 220. The machine learning device 2 updates the associated parameter by repeatedly performing a process of inputting the sensing data BS included in the big data B into the nodes 221 of the input layer and outputting determination data of performing specific function BD included in the big data B that matches the sensing data BS from the nodes 223 of the output layer to mechanically train the artificial neural network model 220.

The trained model 220' created in the machine learning device 2 is utilized to allow the electronic device 3 to perform a specific function in the electronic device 3.

The electronic device 3 includes various devices which may be driven with an input signal to perform a specific function, such as a smart device including a smart phone, a computer, a home appliance, or a vehicle. In the present exemplary embodiment, the electronic device is not limited to a specific electronic device.

In the present disclosure, 'performing specific function' indicates that the electronic device 3 recognizes a call of the user to turn off a first mode such as a stop mode, a sleep mode, or a lock mode and starts an operation in a second mode such as a booting mode, an activation mode, or an unlock mode. The first mode includes a stop mode, a sleep mode, a lock mode, and the like and includes a state in which all functions of the electronic device 3 are inactivated or only some of the functions (for example, a first function unit in FIG. 1A) is activated. The second mode includes a booting mode, an activation mode, and a unlock mode and includes a state in which all functions of the electronic device 3 are activated or in which an inactivated function (for example, a second function unit in FIG. 1A) is activated. For example, the performing specific function may refer to wake-up of the entire system of the electronic device 3, but the scope of the present disclosure is not limited.

The electronic device 3 may include a sensing data generation unit 310, a specific function performing processor 320, a control unit 330, a first function unit 350, a second function unit 360, and a power source unit 370.

The sensing data generation unit 310 includes a microphone 311, a camera unit 312, and an infrared sensor 313, as well as an acceleration sensor, a motion sensor, a photo sensor, a heart rate sensor, a fingerprint recognition sensor, and the like. The sensing data generation unit 310 may generate voice data, image data, proximity data, motion data, location data, and fingerprint recognition data. At least one of generated sensing data BS may be transmitted to the specific function performing processor 320.

The specific function performing processor 320 includes a computing device (not illustrated) which operates an artificial neural network and the artificial neural network computing device (not illustrated) performs an operation requested by an artificial intelligence (AI) recognition model 322 and may be implemented by a general purpose processor or a dedicated AI acceleration processor such as CPU/GPU. That is, the AI recognition model 322 is configured that the trained model 220' created in the machine learning device 2 is embedded in an artificial neural network computing device in the specific function performing processor 320.

The specific function performing processor 320 receives sensing data RS from the sensing data generation unit 310 and inputs the received sensing data RS to a previously prepared AI recognition model 322 to output determination data of performing specific function RD from the AI recognition model 322. A signal to perform a specific function generated based on the output determination data of performing specific function RD is inputted to the control unit 330 to allow the electronic device 3 to perform the specific function under the control of the control unit 330. A detailed operation of the specific function performing processor 320 will be described with reference to FIG. 3.

In the meantime, according to the present disclosure, it is illustrated that the trained model is prepared in the machine learning device 2 and the electronic device 3 acquires the trained model to output the determination data of performing specific function BD in accordance with the input of the sensing data BS in the AI recognition model embedded in the electronic device 3 to perform a specific function. However, according to another exemplary embodiment, additional machine learning may be implemented to perform based on the AI recognition model of the electronic device 3.

The control unit 330 controls an overall operation of the electronic device 3. For example, the control unit may include an application processor (AP), a CPU, or the like.

The control unit 330 receives a signal to perform a specific function from the specific function performing processor 320 to operate the electronic device 3.

The first function unit 350 is an always-on module which is always turned on even in a state in which the power of the electronic device 2 is turned off, and may include a communication unit 380, for example, when the electronic device 3 is a communication device.

The second function unit 360 is a driver which is driven in accordance with a control command of the control unit 330 and may include an output unit such as a display. The first function unit 350 needs to be always turned on. However, the second function unit 360 may be implemented to be normally turned off to reduce the power consumption and perform a function only when a control command of the control unit 330 is received.

The power source unit 370 supplies a power to the electronic device 3. Even though the electronic device 3 is turned off, the first function unit 350 is always supplied with the power from the power source unit 370. In contrast, the second function unit 360 is normally turned off and when a control command is received from the control unit 330, may be supplied with the power from the power source unit 370.

1-1-1 Trained Model Creation Method for Performing Specific Function for Electronic Device (Independent Claim 1, FIG. 2)

FIG. 2 is a flowchart for explaining a trained model creation method for performing a specific function for an electronic device 3 according to an exemplary embodiment of the present disclosure.

As illustrated in FIG. 2, the trained model 220' for performing a specific function may be created by preparing big data B including sensing data BS and determination data of performing specific function BD (S210), preparing an artificial neural network model 220 (S220), and mechanically repeatedly inputting sensing data BS and outputting determination data of performing specific function BD using the artificial neural network model 220 (S230).

Specifically, big data B including, in pairs, sensing data BS received from at least one sensing data generation unit 310 for sensing the presence of a human or a specific behavior and determination data of performing specific function BD, which matches the sensing data BS, for determining whether to perform a specific function of the electronic device 3 is prepared.

The artificial neural network model 220 including nodes 221 of the input layer through which the sensing data BS is inputted, nodes 223 of the output layer through which the determination data of performing specific function BD is outputted, and associated parameters between the nodes 221 of the input layer and the nodes 223 of the output layer is prepared. The artificial neural network model 220 may output the determination data of performing specific function BD from the nodes 223 of the output layer in response to the inputs of the sensing data BS for the nodes 221 of the input layer.

The machine learning device 2 repeatedly performs the machine learning to input the sensing data BS into the nodes 221 of the input layer and output the determination data of performing specific function BD, which matches the sensing data BS, from the nodes 223 of the output layer with respect to a large amount of sensing data BS (BS1, BS2, . . . ) included in the big data B and a large amount of determination data of performing specific function BD (BD1, BD2, . . . ) matching thereto, to update the associated parameter. The machine learning is performed on the artificial neural network model 220 to create the trained model 220' configured by the updated associated parameter.

1-1-2 Trained Model

A trained model for performing a specific function for an electronic device 3 according to an exemplary embodiment of the present disclosure will be described with reference to FIG. 1A.

The trained model for performing a specific function for an electronic device 3 according to the exemplary embodiment of the present disclosure may be acquired by mechanically and repeatedly training the artificial neural network model 220 using the big data B including the sensing data BS and the determination data of performing specific function BD.

Specifically, the artificial neural network model 220 includes the nodes 221 of the input layer through which the sensing data BS is inputted, the nodes 223 of the output layer through which the determination data of performing specific function BD is outputted, and the associated parameters between the nodes 221 of the input layer and the nodes 223 of the output layer and may output the determination data of performing specific function BD from the nodes 223 of the output layer in response to the input of the sensing data BS for the nodes 221 of the input layer.

The machine learning device 2 updates the associated parameters by repeatedly performing a process of inputting the sensing data BS into the nodes 221 of the input layer and outputting the determination data of performing specific function BD, which matches the sensing data BS, from the nodes 223 of the output layer to mechanically train the artificial neural network mode 220, thereby acquiring the trained model 220'.

1-1-3 Dedicated Chip for Performing Specific Function for Electronic Device (Independent Claim 2, FIG. 3)

The dedicated chip 4 for performing a specific function includes an AI recognition model 322' embedded based on the trained model 220' created by performing machine learning in the machine learning device 2. The dedicated chip 4 for performing a specific function is connected to the electronic device 3 to input sensing data RS received from the electronic device 3 into the AI recognition model 322' and output determination data of performing specific function RD matching the sensing data RS from the AI recognition model 322'.

FIG. 3 is a block diagram for explaining a dedicated chip 4 for performing a specific function.

As illustrated in FIG. 3, the dedicated chip 4 for performing a specific function for an electronic device 3 according to the exemplary embodiment of the present disclosure may include a sensing data receiving unit 321', an AI recognition model 322', and a specific function performance determination data output unit 323'.

The sensing data BS receiving unit 321' receives the sensing data RS from the sensing data generation unit 310 of the electronic device 3 to transmit the sensing data to the AI recognition model 322'.

The AI recognition model 322' may be embedded based on the trained model 220' which is created in advance using the artificial neural network model 220 including the nodes 221 of the input layer through which the sensing data BS is inputted, the nodes 223 of the output layer through which the determination data of performing specific function BD is outputted, and the associated parameters between the nodes 221 of the input layer and the nodes 223 of the output layer. The artificial neural network model 220 may output the determination data of performing specific function BD from the nodes 223 of the output layer in response to the input of the sensing data BS for the nodes 221 of the input layer. The trained model 220' implemented by the associated parameter updated by updating the associated parameters by repeatedly performing a process of inputting the sensing data BS into the nodes 221 of the input layer and outputting the determination data of performing specific function BD matching the sensing data BS from the nodes 223 of the output layer may be created. Further, the AI recognition model 322' based on the trained model 220' may be embedded in the dedicated chip 4 for performing a specific function.

The AI recognition model 322' which is provided in advance in the dedicated chip 4 for performing a specific function receives the sensing data RS from the sensing data receiving unit 321' to output the determination data of performing specific function RD matching the sensing data RS through the specific function performance determination data output unit 323'.

Figure 4:
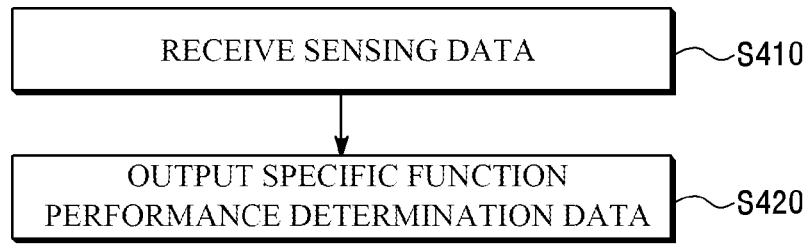
FIG. 4 is a flowchart for explaining an operation of a dedicated chip of performing a specific function according to an exemplary embodiment of the present disclosure.

1-1-4 Learning Method of Dedicated Chip for Performing Specific Function for Electronic Device (Independent Claim 4, FIG. 4)

The dedicated chip 4 for performing a specific function is connected to the electronic device 3 to input sensing data RS received from the electronic device 3 to the AI recognition model 322' to output determination data of performing specific function RD matching the sensing data RS from the AI recognition model 322'. FIG. 4 is a flowchart for explaining an operation of a dedicated chip 4 for performing a specific function.

As illustrated in FIG. 4, the dedicated chip 4 for performing a specific function may receive the sensing data RS from the sensing data generation unit 310 of the electronic device 3 (S410). Further, the dedicated chip 4 for performing a specific function may output the determination data of performing specific function RD for determining whether to perform the specific function of the electronic device 3 by matching the sensing data RS (S420). Here, the determination data of performing specific function RD which matches the sensing data RS may be outputted based on the artificial intelligence (AI) recognition model 322'.

The AI recognition model 322' is configured such that the trained model 220' may be embedded in the dedicated chip 4 for performing a specific function.

Specifically, the AI recognition model 322' may be embedded based on the trained model 220' which is created in advance using the artificial neural network model 220 including the nodes 221 of the input layer through which the sensing data BS is inputted, the nodes 223 of the output layer through which the determination data of performing specific function BD is outputted, and the associated parameters between the nodes 221 of the input layer and the nodes 223 of the output layer. The artificial neural network model 220 may output the determination data of performing specific function BD from the nodes 223 of the output layer in response to the input of the sensing data BS for the nodes 221 of the input layer. The trained model 220' implemented by the associated parameter updated by updating the associated parameters by repeatedly performing a process of inputting the sensing data BS into the nodes 221 of the input layer and outputting the determination data of performing specific function BD matching the sensing data BS from the nodes 223 of the output layer may be created. Further, the AI recognition model 322' based on the trained model 220' may be embedded in the dedicated chip 4 for performing a specific function.

Here, the orders of generating the sensing data BS, generating the determination data of performing specific function BD, and forming the artificial neural network model 220 are not limited. That is, the artificial neural network model 220 may be formed after generating the data or the data may be generated after forming the artificial neural network model 220, or the processes may be simultaneously performed.

Further, the dedicated chip 4 for performing a specific function may determine whether the determination data of performing specific function is equal to or higher than a predetermined threshold by comparing the determination data of performing specific function acquired as a result of the machine learning with reference specific function performing data which is stored in advance in the storage unit 340 included in the electronic device 3 to be described below and when it is determined that the determination data of performing specific function is equal to or higher than a predetermined threshold, generate a signal for allowing the electronic device 3 to perform a specific function.

Figure 5:
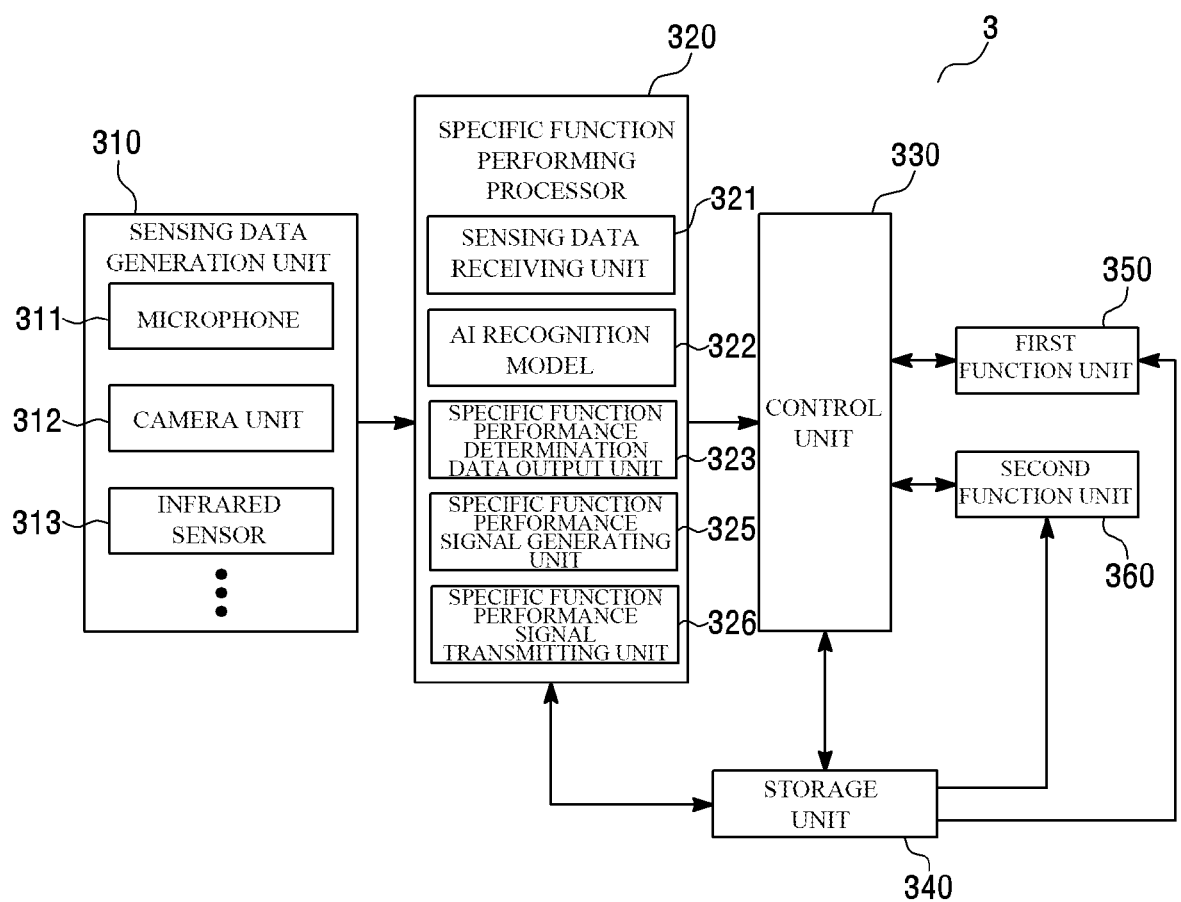
FIG. 5 is a block diagram illustrating an electronic device according to an exemplary embodiment of the present disclosure.

1-1-5 Electronic Device (Independent Claim 5, FIG. 5)

86 The electronic device 3 generates the determination data of performing specific function RD which matches the sensing data RS using the sensing data RS and may perform a specific function based on the generated determination data of performing specific function RD.

FIG. 5 is a block diagram for explaining the electronic device 3.

As illustrated in FIG. 5, the electronic device 3 according to the exemplary embodiment of the present disclosure may include a sensing data generation unit 310, a specific function performing processor 320, a control unit 330, and a storage unit 340. The electronic device 3 according to the exemplary embodiment of the present disclosure may further include a power source unit 370, a first function unit 350, and a second function unit 360. When the above description of the exemplary embodiment is applied to any of individual configurations and functions, the description thereof will be omitted.

The sensing data generation unit 310 may generate voice data, image data, position data, fingerprint recognition data from a microphone 311, a camera unit 312, and an infrared sensor 313, as well as an acceleration sensor, a motion sensor, a photo sensor, a heart rate sensor, and a fingerprint recognition sensor. At least one of generated sensing data may be transmitted to the specific function performing processor 320.

The specific function performing processor 320 may include a sensing data receiving unit 321, a trained model 322, a specific function performance determination data output unit 323, a specific function performance signal generating unit 325, and a specific function performance signal transmitting unit 326.

The sensing data receiving unit 321 may receive the sensing data RS from the sensing data generation unit 310 to transmit the sensing data to the AI recognition model 322.

The AI recognition model 322 may be embedded based on the trained model 220' which is created in advance using the artificial neural network model 220 including the nodes 221 of the input layer through which the sensing data BS is inputted, the nodes 223 of the output layer through which the determination data of performing specific function BD is outputted, and the associated parameters between the nodes 221 of the input layer and the nodes 223 of the output layer. The artificial neural network model 220 may output the determination data of performing specific function BD from the nodes 223 of the output layer in response to the input of the sensing data BS for the nodes 221 of the input layer. The trained model 220' implemented by the associated parameter updated by updating the associated parameters by repeatedly performing a process of inputting the sensing data BS into the nodes 221 of the input layer and outputting the determination data of performing specific function BD which forms a pair with the sensing data BS from the nodes 223 of the output layer may be created. Further, the AI recognition model 322' based on the trained model 220' may be embedded in the specific function performing processor 320.

The determination data of performing specific function RD may include information for determining whether to perform a specific function of the electronic device 3 and the information may be outputted through the specific function performance determination data output unit 323.

The specific function performance signal generating unit 325 may generate a signal to perform a specific function based on the determination data of performing specific function RD. For example, the determination data of performing specific function RD is compared with reference specific function performing data including contents about a predetermined threshold which is stored in advance in the storage unit 340 and when it is determined that the determination data of performing specific function RD is equal to or higher than the predetermined threshold, the signal to perform a specific function may be generated.

The generated signal to perform a specific function may be transmitted to the control unit 330 by means of the specific function performance signal transmitting unit 326. By doing this, the control unit 330 controls the electronic device 3 to perform a specific function based on the signal to perform a specific function.

The control unit 330 controls an overall operation of the electronic device 3. For example, the control unit may include an application processor (AP), a CPU, or the like.

The control unit 330 receives a signal to perform a specific function from the specific function performing processor 320 to generate a driving command to drive the electronic device 3.

The storage unit 340 may store the data of the electronic device 3. The storage unit 340 may store all processing results of the specific function performing processor 320 and the control unit 330. That is, the specific function performing processor 320 and the control unit 330 may share the same storage unit 340. However, according to another exemplary embodiment, the specific function performing processor 320 and the control unit 330 may use separate storage units.

The storage unit 340 may further store a driving command of the electronic device 3 generated by the control unit 330.

The storage unit 340 may previously store information about reference specific function performing data including contents about a predetermined threshold to generate a signal to perform a specific function. The specific function performing processor 320 may generate the signal to perform a specific function by referring to information about the reference specific function performing data.

According to another exemplary embodiment, the specific function performing processor 320 may be implemented to further include a correction unit (not illustrated) and a learning unit (not illustrated). By doing this, when the output determination data of performing specific function includes error data, corrected data obtained by correcting the error data is generated and the corrected data is machine-learned by the AI recognition model 322 to manufacture an AI recognition model 322 with improved precision.

For example, when a user inputs specific voice information and result data in which the voice information is not sensed is outputted by the specific function performance determination data output unit 323, the correction unit (not illustrated) may output corrected data obtained by correcting the result data. The user may transmit feedback information indicating that the output result data includes an error to the correction unit (not illustrated) and the correction unit (not illustrated) may generate corrected data based on the feedback information. The corrected data is transmitted to the learning unit (not illustrated) to be transmitted to the nodes of the input layer of the AI recognition model 322 and the determination data of performing specific function which is outputted in advance from the specific function performing processor 320 is outputted through the nodes of the output layer of the AI recognition model 322 so that the AI recognition model 322 may perform the machine learning.

A model (not illustrated) with an improved precision is acquired as the machine learning result of the AI recognition model 322 and the determination data of performing specific function output through the model (not illustrated) with the improved precision may contribute to generating a signal to perform a specific function in a state with the improved precision.

Figure 6:
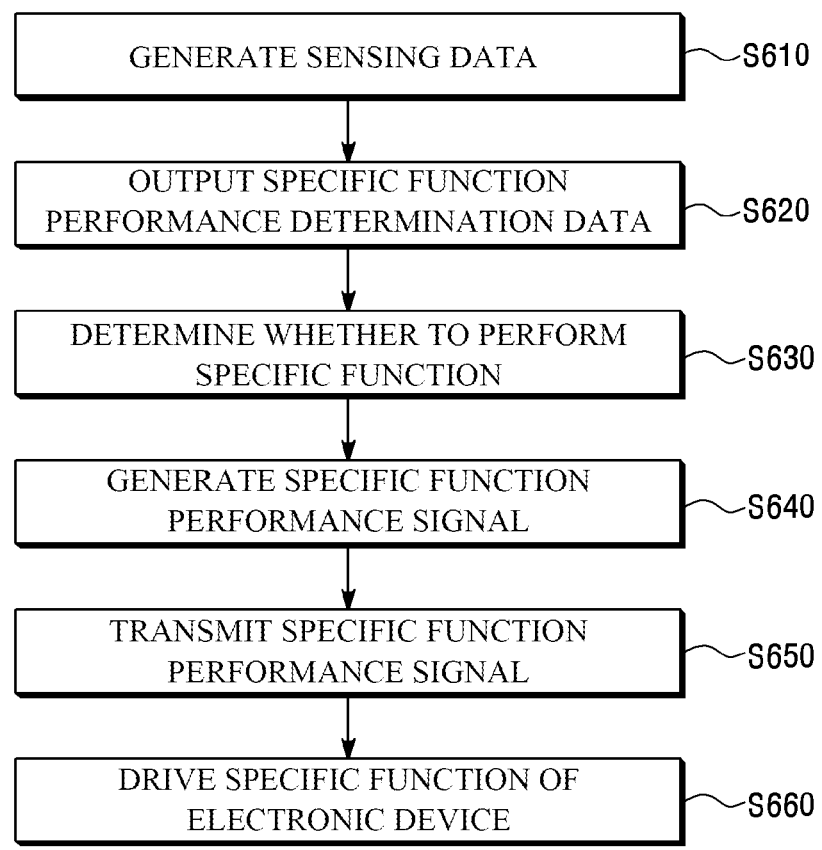
FIG. 6 is a flowchart for explaining an operation of an electronic device according to an exemplary embodiment of the present disclosure.

Independent Claim 6—Driving Method of Electronic Device (FIG. 6)

FIG. 6 is a flowchart for explaining a driving method of the electronic device 3 described in FIG. 5.

As illustrated in FIG. 6, when the sensing data generation unit 310 generates sensing data BS for sensing human behavior (S610), the specific function performing processor 320 may receive the sensing data RS from the sensing data generation unit 310 and output the determination data of performing specific function RD for determining whether the electronic device 3 performs a specific function by pairing with the received sensing data RS through the AI recognition model 322 (S620). Here, the AI recognition model 322 is as described above in FIG. 5.

The specific function performing processor 320 determines whether to perform the specific function based on the determination data of performing specific function RD (S630) and generates a signal to perform a specific function based on the result of determining whether to perform a specific function to transmit the signal to perform a specific function to the control unit 330 (S640). For example, the determination data of performing specific function RD is compared with reference specific function performing data including contents about a predetermined threshold which is stored in advance in the storage unit 340 and when it is determined that the determination data of performing specific function RD is equal to or higher than the predetermined threshold, the signal to perform a specific function may be generated and transmitted to the control unit 330.

The control unit 330 receives the signal to perform a specific function from the specific function performing processor 320 to generate a driving command to drive the electronic device 3. The electronic device 3 is driven in accordance with the corresponding command (S650).

1-1-6 System for Performing Specific Function for Electronic Device

Figure 7:
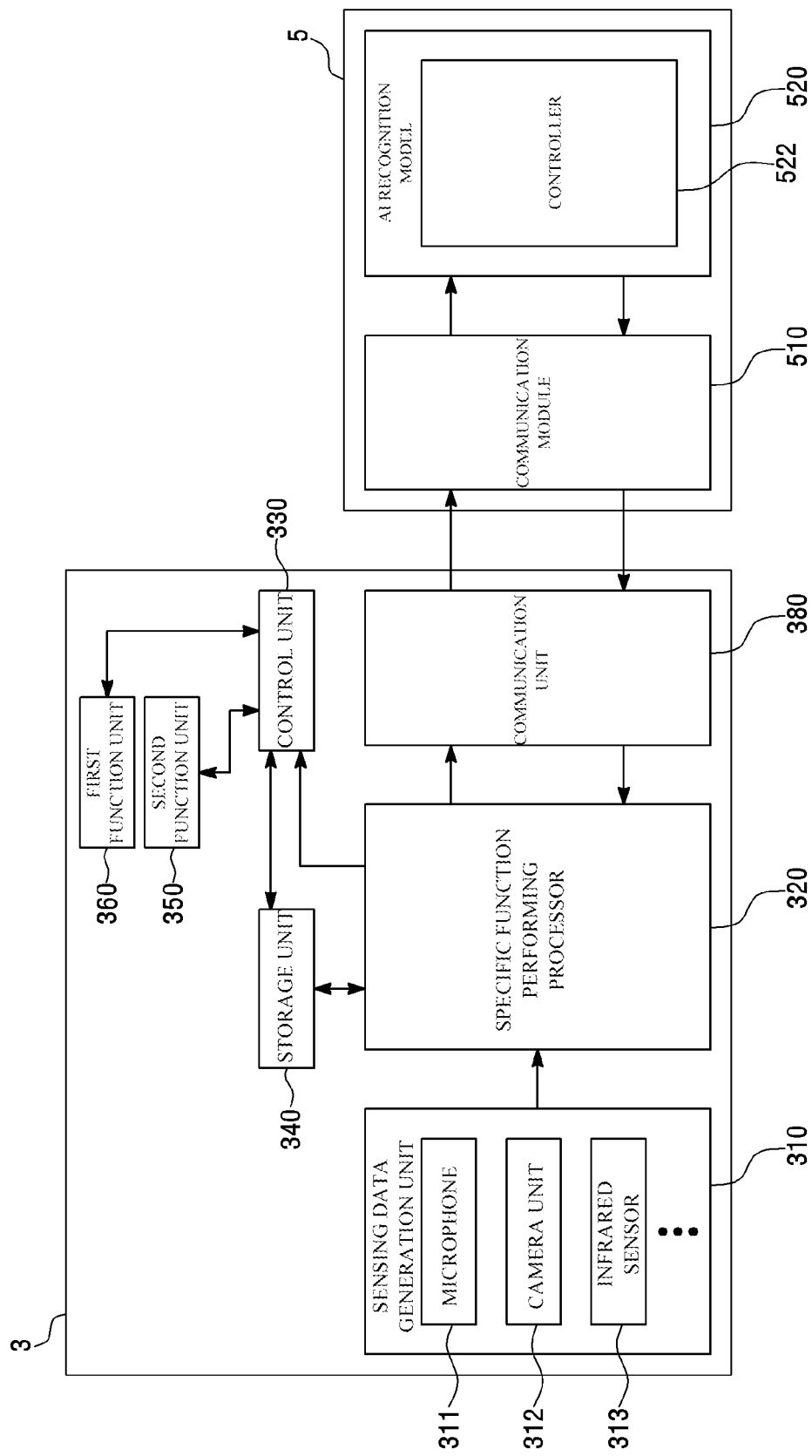
FIG. 7 is a block diagram illustrating an electronic device which communicates with a server according to an exemplary embodiment of the present disclosure.

Independent Claim 7—Electronic Device Communicating with Server (FIG. 7)

FIG. 7 is a block diagram for explaining an electronic device 3 which communicates with a server 5 according to an exemplary embodiment of the present disclosure. When the above description of the exemplary embodiment is applied to any of individual configurations and functions, the description thereof will be omitted.

As illustrated in FIG. 7, the electronic device 3 which communicates with a server 5 may include a sensing data generation unit 310, a specific function performing processor 320, a control unit 330, a storage unit 340, and a communication unit 380.

The sensing data generation unit 310 performs the same function as the sensing data generation unit 310 illustrated in FIG. 5.

The specific function performing processor 320 receives sensing data RS from the sensing data generation unit 310 to transmit the sensing data to the communication unit 380.

The communication unit 380 transmits the sensing data RS received from the specific function performing processor 320 to the server 5. Further, the communication unit receives the determination data of performing specific function RD from the server 5 to transmit the data to the specific function performing processor 320.

The specific function performing processor 320 may generate a signal to perform a specific function based on the determination data of performing specific function RD received from the server 5. For example, the specific function performing processor 320 compares the determination data of performing specific function RD with reference specific function performing data including contents about a predetermined threshold which is stored in advance in the storage unit 340 and when it is determined that the determination data of performing specific function RD is equal to or higher than the predetermined threshold, generates the signal to perform a specific function.

The storage unit 340 and the control unit 330 may be implemented in the same/similar way to the storage unit 340 and the control unit 330 described in FIG. 5.

The server 5 may include a communication module 510 and a controller 522.

The communication module 510 receives the sensing data RS from the communication unit 380 to transmit the sensing data to the controller 522. Further, the communication module 510 transmits the determination data of performing specific function RD outputted from the controller 522 to the communication unit 380.

The controller 522 may output determination data of performing specific function RD for determining whether to perform a specific function of the electronic device 3 through the artificial intelligence (AI) recognition model 520 by matching the sensing data RS.

The AI recognition model 520 may be embedded based on the trained model 220' which is created in advance using the artificial neural network model 220 including the nodes 221 of the input layer through which the sensing data BS is inputted, the nodes 223 of the output layer through which the determination data of performing specific function BD is outputted, and the associated parameters between the nodes 221 of the input layer and the nodes 223 of the output layer. The artificial neural network model 220 may output the determination data of performing specific function BD from the nodes 223 of the output layer in response to the input of the sensing data BS for the nodes 221 of the input layer. The trained model 220' implemented by the associated parameter updated by updating the associated parameters by repeatedly performing a process of inputting the sensing data BS into the nodes 221 of the input layer and outputting the determination data of performing specific function BD, which pairs with the sensing data BS, from the nodes 223 of the output layer may be created. Further, the AI recognition model 520 based on the trained model 220' may be embedded in the controller 522.

The controller 522 transmits the determination data of performing specific function BD outputted from the AI recognition model 520 to the electronic device 3 via the communication module 510. The specific function performing processor 320 of the electronic device 3 may generate a signal to perform a specific function based on the determination data of performing specific function RD received from the server 5 to operate the second function unit 360.

Figure 8:
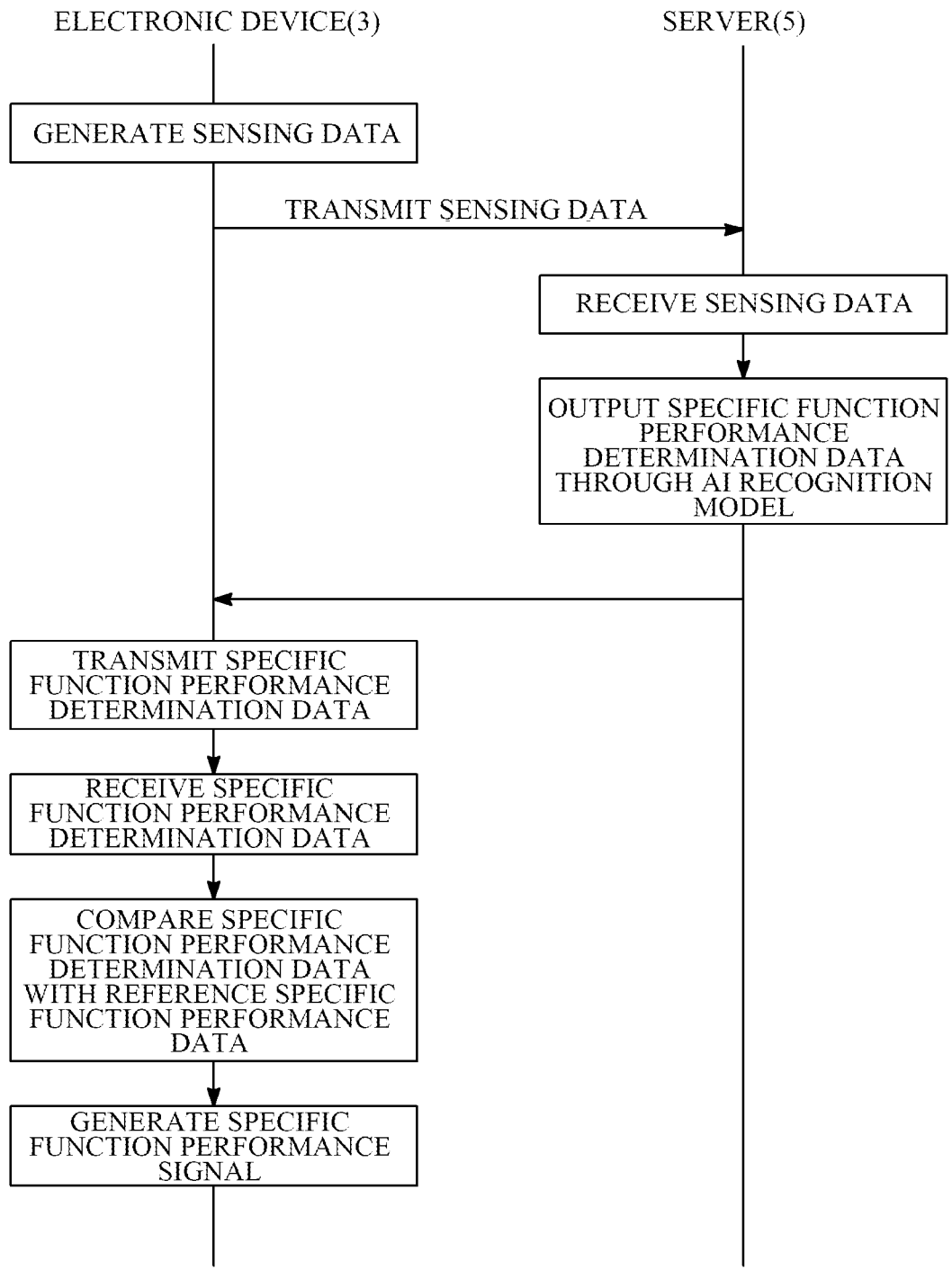
FIG. 8 is a flowchart for explaining an operation of an electronic device which communicates with a server according to an exemplary embodiment of the present disclosure.

Independent Claim 8—Driving Method of Electronic Device Communicating with Server (FIG. 8)

FIG. 8 is a flowchart for a driving method of an electronic device 3 which communicates with the server 5 according to the exemplary embodiment of the present disclosure.

As illustrated in FIG. 8, the electronic device 3 may generate sensing data RS for sensing human behavior. The electronic device may transmit the generated sensing data RS to the server 5. The server 5 may receive the sensing data RS to output determination data of performing specific function RD for determining whether to perform a specific function of the electronic device 3 through the AI recognition model 520 by matching the sensing data RS.

The AI recognition model 520 performs the same function as the AI recognition model 520 described above in FIG. 7.

The server 5 may transmit the output determination data of performing specific function RD to the electronic device 3.

The electronic device 3 receives the determination data of performing specific function RD from the server 5 to generate a signal for allowing the electronic device 3 to perform a specific function based on the determination data of performing specific function. Further, the electronic device 3 may be driven based on the signal to perform a specific function.

Modified Example 1-1-7 System for Performing Specific Function of Electronic Device and Activating Specific Function As described above, the electronic device 3 of the present disclosure includes various devices which may be driven with an input signal to perform a specific function, such as a smart device including a smart phone, a computer, a home appliance, or a vehicle. In the present exemplary embodiment, it is not limited to a specific electronic device.

Further, as described above, in the present disclosure, 'performing specific function' indicates that the electronic device 3 recognizes call of the user to turn off a first mode such as a stop mode, a sleep mode, or a lock mode and start an operation in a second mode, such as a booting mode, an activation mode, or an unlock mode. The first mode includes a stop mode, a sleep mode, and a lock mode and includes a state in which all functions of the electronic device 3 are inactivated or only some of the functions (for example, a first function unit in FIG. 1A) is activated. The second mode includes a booting mode, an activation mode, and a unlock mode and includes a state in which all functions of the electronic device 3 are activated or an inactivated function (for example, a second function unit in FIG. 1A) is activated.

Hereinafter, a system for performing a specific function of an electronic device 3 and activating a specific function will be described with reference to FIGS. 9 to 15.

Figure 9:
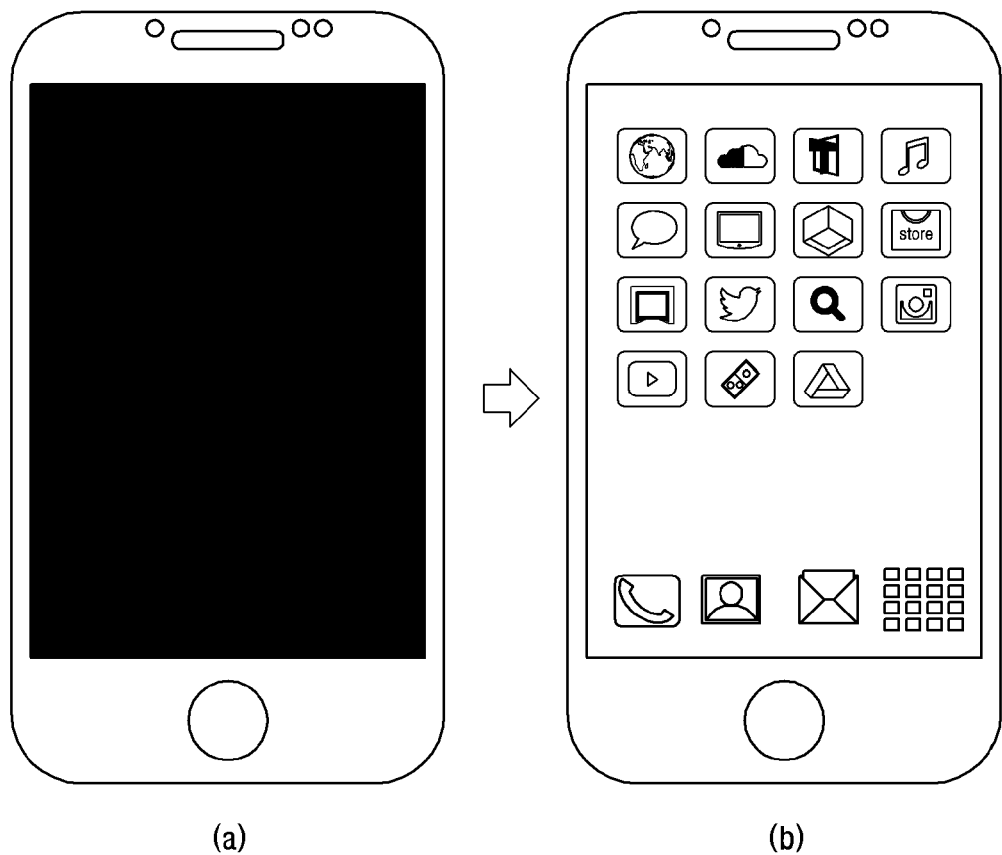
FIGS. 9 to 15 are views referenced to explain a specific function performing systems by type of electronic device.

As illustrated in FIG. 9, when the electronic device 3 is a smart phone, the smart phone generates determination data of performing specific function of the smart phone which matches the sensing data BS using the embedded AI recognition model 322 based on the sensing data BS. Further, the smart phone generates the signal to perform a specific function based on the determination data of performing specific function so that the smart phone may perform the specific function.

For example, the smart phone generates determination data of performing specific function such as unlock data, booting data, sleep mode off data, voice assistant call data, music play data, volume control (up or down) data, or screen brightness control (up or down) data of the smart phone which matches the voice data using the embedded AI recognition model 322. Further, the signal to perform a specific function is generated based on the determination data of performing specific function so that the first mode of the smart phone is turned off and the smart phone may operate in a second mode.

Further, the smart phone may generate unlock determination data of the smart phone which matches the image data using the embedded AI recognition model 322. Further, a unlock signal is generated based on the unlock determination data so that the smart phone turns off the lock mode and operates in an unlock mode. (FIG. 9 (a)—>(b))

Further, the smart phone generates determination data of performing specific function such as unlock determination data of the smart phone or various authentication data which matches fingerprint recognition data, using the embedded AI recognition model 322. Further, the signal to perform a specific function is generated based on the determination data of performing specific function so that the smart phone turns off the first mode and may operate in a second mode.

Figure 10:
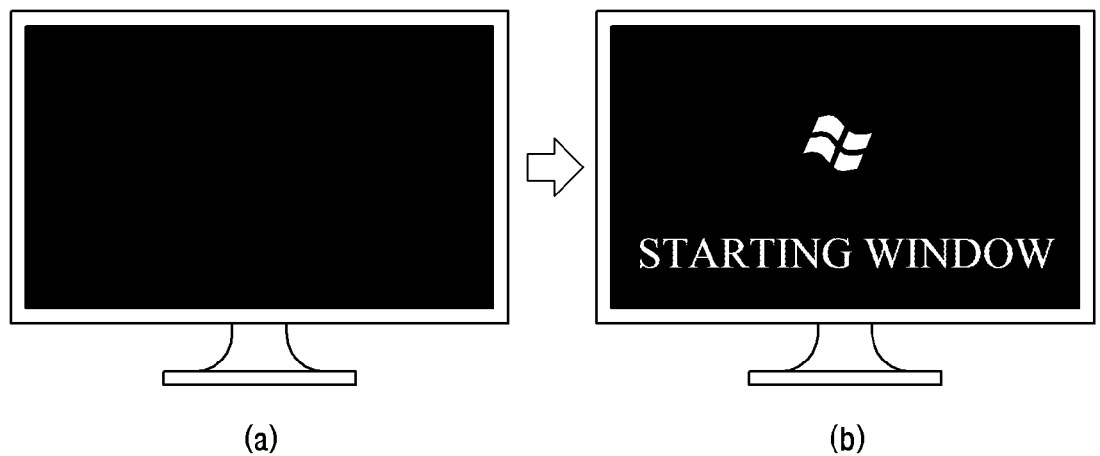

Similarly, as illustrated in FIG. 10, when the electronic device 3 is a computer (for example, a tablet, a notebook, or a PC), the computer generates determination data of performing specific function of the computer which matches the sensing data BS using the embedded AI recognition model 322 based on the sensing data BS. Further, the signal to perform a specific function is generated based on the determination data of performing specific function so that the computer may perform the specific function. In the exemplary embodiment of the present disclosure, the sensing data BS may include voice data, infrared sensor sensing data, image data, and fingerprint recognition data.

For example, the computer generates determination data of performing specific function such as unlock data, booting data, sleep mode off data, voice assistant call data, music play data, camera activation data, volume control (up or down) data, or screen brightness control (up or down) data of the computer which matches the voice data using the embedded AI recognition model 322. Further, the signal to perform a specific function is generated based on the determination data of performing specific function so that the computer turns off the first mode and may operate in a second mode, FIG. 10 (a)→(b) illustrates that the computer turns off a stop mode and may operate in a booting mode.

Further, the computer may generate unlock determination data of the computer which matches the image data using the embedded AI recognition model 322. Further, the unlock signal is generated based on the unlock determination data so that the computer turns off the lock mode and operates in an unlock mode.

Further, the computer generates determination data of performing specific function such as unlock determination data of the computer or various authentication data which matches fingerprint recognition data, using the embedded AI recognition model 322. Further, the signal to perform a specific function is generated based on the determination data of performing specific function so that the computer turns off a first mode and may operate in a second mode.

Figure 11:
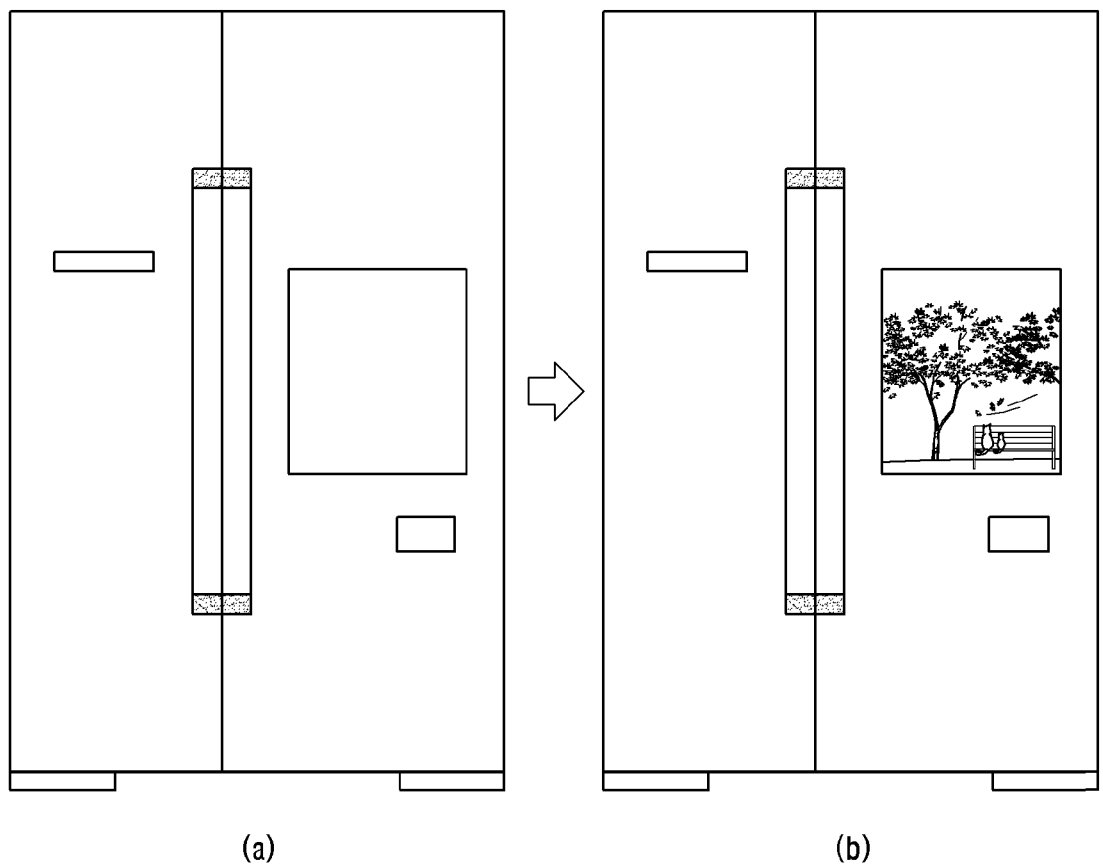

As illustrated in FIG. 11, when the electronic device 3 is a home appliance, the home appliance generates determination data of performing specific function which matches the sensing data BS using the embedded AI recognition model 322 based on the sensing data BS. Further, the home appliance generates the signal to perform a specific function based on the determination data of performing specific function so that the home appliance may perform the specific function. In the exemplary embodiment of the present disclosure, the sensing data BS may include voice data, infrared sensor sensing data, image data, fingerprint recognition data, and the like.

For example, a refrigerator generates data for determining whether a display is on, which matches the voice data, using the embedded AI recognition model 322. Further, a display-on signal is generated based on the data for determining whether a display is on so that a display device of the refrigerator is turned on. (FIG. 11 (a)→(b))

Further, the refrigerator may generate determination data of performing specific function such as unlock determination data of the refrigerator or various authentication data which matches fingerprint recognition data, using the embedded AI recognition model 322. Further, the signal to perform a specific function is generated based on the determination data of performing specific function so that the refrigerator turns off a first mode and may operate in a second mode.

Figure 13:
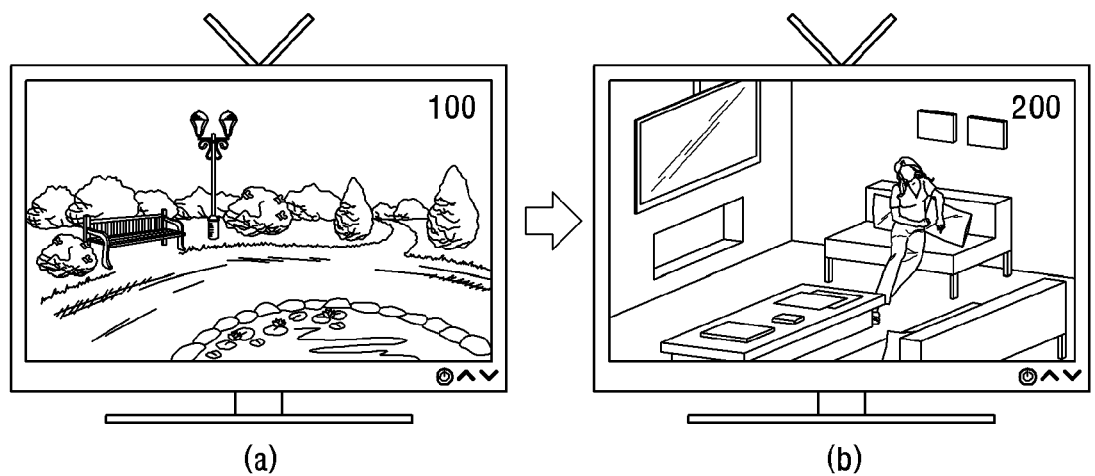

For example, a TV generates a determination data of performing specific function including data for determining whether a TV is on, channel control data, and volume control data, which matches the voice data, using the embedded AI recognition model 322. Further, the signal to perform a specific function is generated based on the determination data of performing specific function so that the TV turns off the first mode and may operate in a second mode. FIG. 13 (a)→(b) illustrate that the TV turns off an A channel 100 mode and operates in a B channel 200 mode.

Figure 14:
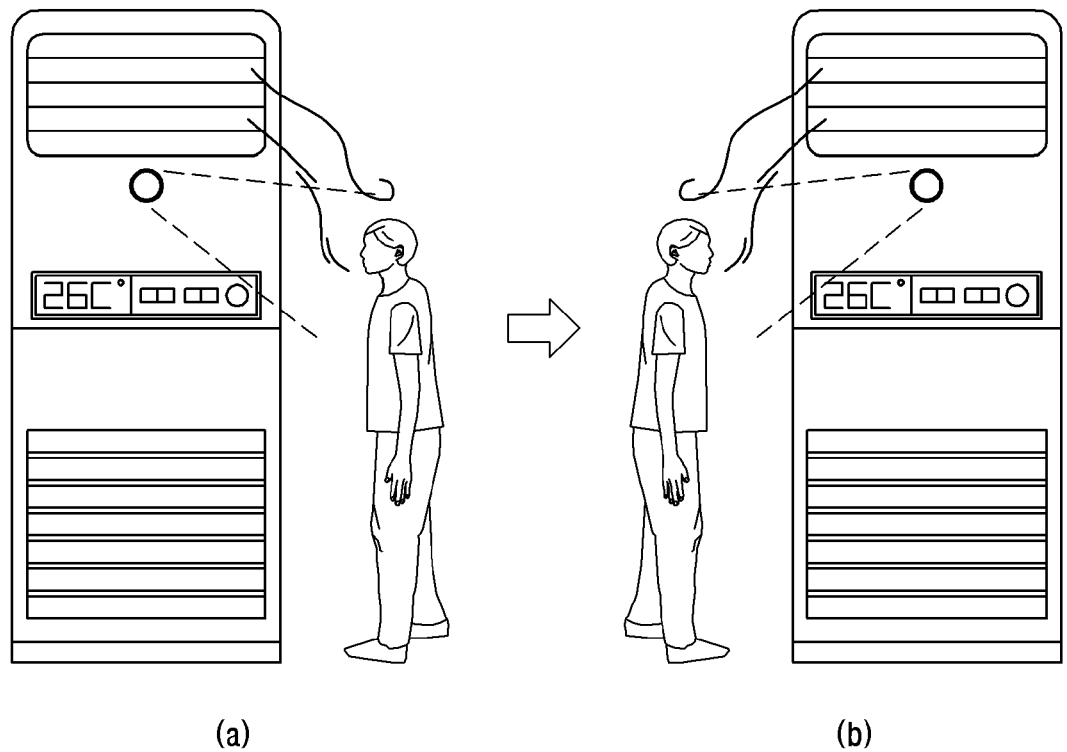

For example, an air conditioner generates data for determining a blowing direction of cool air, which matches the image data, using the embedded AI recognition model 322. Here, the image data refers to data acquired by tracking a user using a camera mounted in the air conditioner. A blowing signal is generated based on the data for determining a blowing direction of cool air so that as illustrated in FIG. 14, the A direction blowing mode of the air conditioner is turned off and the air conditioner operates in a B direction blowing mode.

Figure 12:
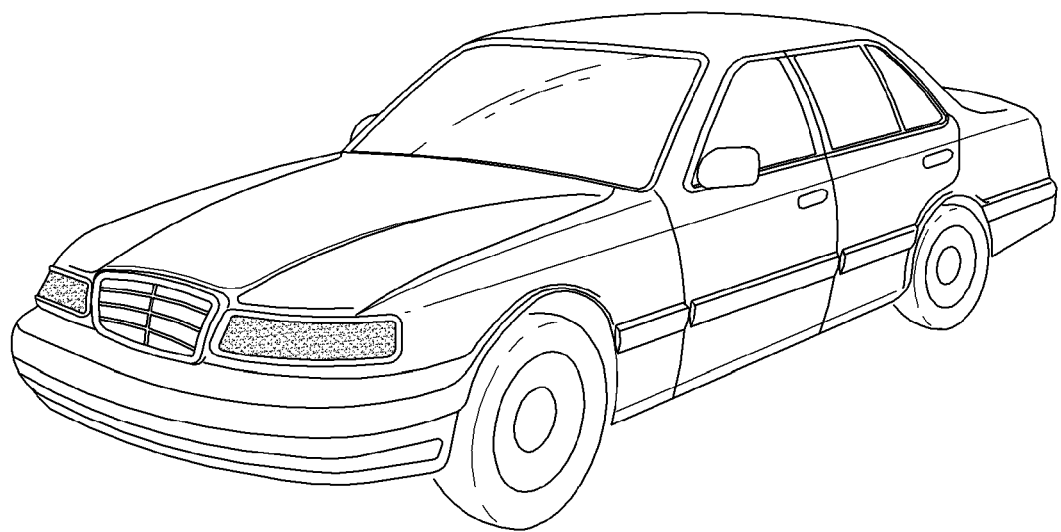
Figure 12:
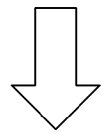
Figure 12:
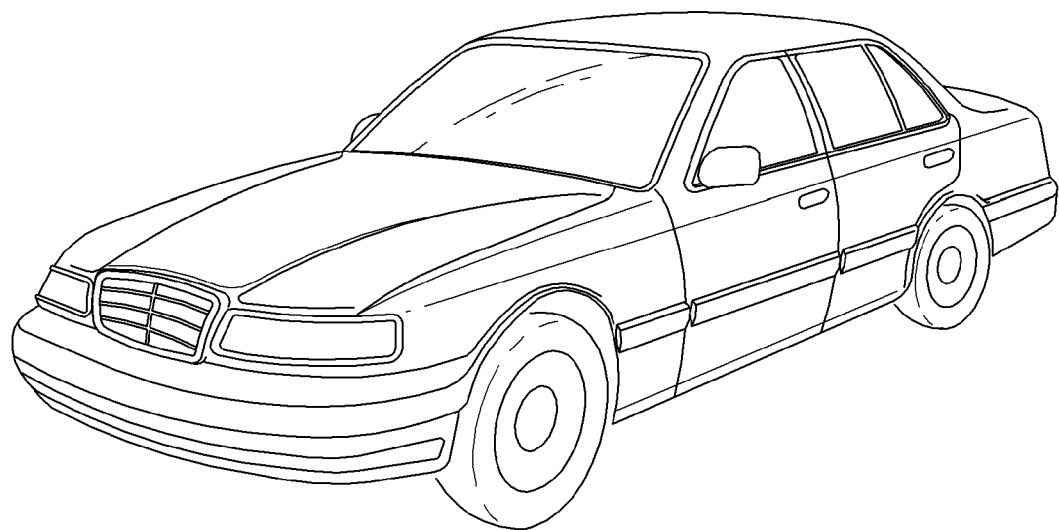

As illustrated in FIG. 12, when the electronic device 3 is a vehicle, the vehicle generates determination data of performing specific function of the vehicle, which matches the sensing data BS, using the embedded AI recognition model 322 based on the sensing data BS. Further, the signal to perform a specific function is generated based on the determination data of performing specific function of the vehicle to perform a specific function of the vehicle. In the exemplary embodiment of the present disclosure, the sensing data BS may include voice data, infrared sensor sensing data, image data, fingerprint recognition data, and the like.

For example, the vehicle generates determination data of performing specific function including unlock of the vehicle, various authentication, and engine start, which matches the fingerprint recognition data, using the embedded AI recognition model 322. Further, the signal to perform a specific function is generated based on the determination data of performing specific function so that the first mode of the vehicle is turned off and the vehicle may operate in a second mode, FIG. 12 illustrates that the vehicle verifies a user's fingerprint to operate in an engine start mode (b) from an engine off mode (a).

For example, the vehicle may generate a signal to perform a specific function based on determination data of performing specific function such as rear window heater on/off, front window defroster on/off, air conditioner/heater (including a handle/seat heater) on/off, wiper on/off, high beam/various lights on/off, emergency light on/off, music/radio on/off, and volume control, navigation call, voice assistant call, driving mode change, start-up, or gear shift, which matches the voice data, using the embedded AI recognition model 322, so that a first mode of the vehicle is turned off and the vehicle may operate in a second mode.

Specifically, when the electronic device 3 is a vehicle, a microphone which is installed in the vehicle (or separately attached to the vehicle) recognizes a voice command of the user to operate a heater in the vehicle, operate wipers, play music, or operate the air conditioner using the embedded AI recognition model 322 to allow the vehicle to perform predetermined additional functions. The additional function may be performed only by simply transmitting a voice command to the vehicle while the user drives a vehicle so that the user may focus on the driving without averting the vision elsewhere to prevent the accident.

Figure 15:
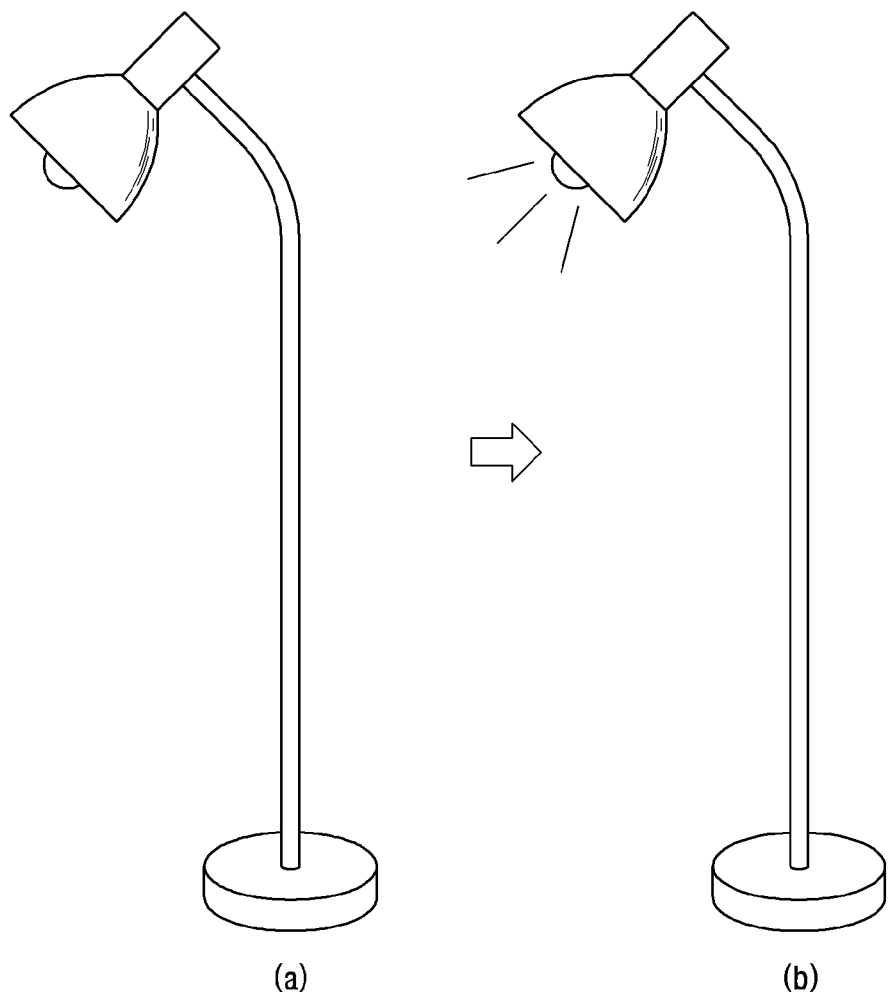

Further, it is possible to implement that not only the vehicle always recognizes the voice command of the user to perform the predetermined addition function, but also, according to another exemplary embodiment, the vehicle recognizes the voice command of the user after the user pushes a separate button (mounted on a handle or a seat) to perform the predetermined additional function. In the former case, the voice command of the user is always recognized so that it is more convenient. However, when there is a noise in the vehicle, there may be a misrecognition problem due to the nose so that in the latter case, only when the button is pushed, the voice command of the user excluding the noise may be better recognized. Therefore, it is advantageous in that the voice command may be conveniently recognized even in the noisy environment. As illustrated in FIG. 15, when the electronic device 3 is an illumination device, the illumination device generates illumination device on/off determination data, which matches the sensing data BS, using the embedded AI recognition model 322 based on the sensing data BS. An illumination device on/off signal is generated based on the illumination device on/off determination data to turn on/off the illumination device. According to the exemplary embodiment of the present disclosure, the sensing data BS includes voice data, image data, and the like.

For example, FIG. 15 illustrates that the illumination device recognizes a user's voice so that the illumination device operates by changing an off-state (a) to an on-state (b).

However, the present disclosure is not limited to the electronic device 3 described in FIGS. 9 to 15 but the contents of FIGS. 9 to 15 may be applied to every type of device including a controller which performs arithmetic functions in the same/similar way.

For reference, the contents about the sensing data and the determination data of performing specific function for the electronic device 3 described in FIGS. 9 to 15 are merely an example, and the scope of the present disclosure is not limited thereto and may be applied to another type of sensing data and determination data of performing specific function in the same/similar way.

The contents about the mode change of the electronic device 3 described in FIGS. 9 to 15 may be implemented by applying 1-1-1 Trained model creation method for performing specific function for electronic device, 1-1-2 Trained model, 1-1-3 Dedicated chip for performing specific function for electronic device, 1-1-4 Operation method of dedicated chip for performing specific function for electronic device, 1-1-5 Electronic device, and 1-1-6 System for performing specific function for electronic device in the same/similar way.

Embodiment 2 (Electronic Device which Performs Specific Function Based on Human Voice Information)

Hereinafter, a system of allowing an electronic device 3 to perform a specific function based on human voice information according to another exemplary embodiment of the present disclosure will be described.

Example 2-1 Trained Model System for Unlocking Locked Smart Phone Based on Voice Data Specifically, a trained model system for unlocking a locked smart phone based on voice data according to another exemplary embodiment of the present disclosure will be described.

The description of the system 1 for performing a specific function for an electronic device based on the artificial neural network described above in FIG. 1A may be applied to the trained model system for unlocking the locked smart phone based on the voice data according to another exemplary embodiment of the present disclosure in the same/similar way.

For example, the trained model system for unlocking the locked smart phone based on the voice data according to another exemplary embodiment of the present disclosure uses the voice data as the sensing data BS, uses the smart phone as the electronic device 3 and uses data for determining whether the smart phone is unlocked as the determination data of performing specific function BD.

The machine learning device 2 may generate the trained model 220' by repeatedly performing the process of inputting the voice data into the nodes 221 of the input layer and outputting the data for determining whether the smart phone is unlocked from the nodes 223 of the output layer, based on the artificial neural network model 220.

The electronic device 3 inputs the voice data to the AI recognition model 322 in which the trained model 220' is embedded to output smart phone unlock determination data from the AI recognition model 322. The locked smart phone may be unlocked based on the signal to perform a specific function generated from the output smart phone unlock determination data.

It is advantageous in that the voice data is inputted to the AI recognition model 322 to quickly and precisely output the smart phone unlock determination data.

Further, it is advantageous in that the AI recognition model 322 which is trained in advance is used so that separate learning is not performed whenever the real time voice data is inputted, but the smart phone unlock determination data may be automatically quickly output so that the convenience of the user may be promoted.

Furthermore, it is advantageous in that the power is not always turned on, but the system is driven only when sensing data is received so that the power consumption may be reduced.

2-1-1 Trained Model Creation Method for Unlocking Smart Phone

The above description of Example 1-1-1 may be applied to a trained model creation method for unlocking a smart phone according to another exemplary embodiment of the present disclosure in the same/similar way.

For example, according to the trained model creation method for unlocking the locked smart phone based on the voice data according to another exemplary embodiment of the present disclosure, the voice data is used as the sensing data BS, the smart phone is used as the electronic device 3 and smart phone unlock determination data is used as the determination data of performing specific function BD.

The machine learning device 2 may generate the trained model 220' by repeatedly performing the process of inputting the voice data into the nodes 221 of the input layer and outputting the data for determining whether the smart phone is unlocked from the nodes 223 of the output layer, based on the artificial neural network model 220.

2-1-2 Trained Model for Unlocking Smart Phone

The above description of Example 1-1-2 may be applied to a trained model for unlocking a smart phone according to another exemplary embodiment of the present disclosure in the same/similar way.

For example, the trained model for unlocking the locked smart phone based on the voice data according to another exemplary embodiment of the present disclosure may be created from the artificial neural network model 220 using the voice data as the sensing data BS, using the smart phone as the electronic device 3 and using data for determining whether the smart phone is unlocked as the determination data of performing specific function BD.

Specifically, the machine learning device 2 may generate the trained model 220' by repeatedly performing the process of inputting the voice data into the nodes 221 of the input layer and outputting the data for determining whether the smart phone is unlocked from the nodes 223 of the output layer, based on the artificial neural network model 220.

2-1-3 Dedicated Chip for Unlocking Smart Phone

The above description of Example 1-1-3 may be applied to a dedicated chip for unlocking a smart phone according to another exemplary embodiment of the present disclosure in the same/similar way.

For example, in the dedicated chip for unlocking the smart phone according to another exemplary embodiment of the present disclosure, the determination data of performing specific function is smart phone unlock determination data in response to the input of the voice data to the smart phone and the machine learning of the artificial neural network model 220 is to repeatedly perform the process of inputting the voice data into the nodes 221 of the input layer and outputting data for determining whether the smart phone is unlocked from the nodes 223 of the output layer, and the trained model 220' created as the result of repeated performance may be embedded in the dedicated chip for unlocking the smart phone as an AI recognition model 322'.

2-1-4 Smart Phone with Unlocking Function Using Artificial Neural Network

The above description of Example 1-1-5 may be applied to a smart phone having an unlocking function using an artificial neural network according to another exemplary embodiment of the present disclosure in the same/similar way.

For example, the determination data of performing specific function is the smart phone unlock determination data in response to the input of the voice data to the smart phone and the machine learning of the artificial neural network model 220 is to repeatedly perform the process of inputting the voice data into the nodes 221 of the input layer and outputting data for determining whether the smart phone is unlocked from the nodes 223 of the output layer, and the trained model 220' created as the result of repeated performance may be embedded in the smart phone as an AI recognition model 322'.

2-1-5 Smart Phone Unlock System Using Artificial Neural Network (Server-Client Model)

The above description of Example 1-1-6 may be applied to the smart phone unlock system using an artificial neural network according to another exemplary embodiment of the present disclosure in the same/similar way and the difference will be mainly described below.

For example, the determination data of performing specific function is data for determining whether the smart phone is unlocked in response to the input of the voice data to the smart phone and the machine learning of the artificial neural network model 220 is to repeatedly perform the process of inputting the voice data into the nodes 221 of the input layer and outputting data for determining whether the smart phone is unlocked from the nodes 223 of the output layer, and the trained model 220' created as the result of repeated performance may be embedded in the server 5 as an AI recognition model 322'.

Example 2-2 Trained Model System for Turning Off Sleep Mode of Computer Based on Voice Data Model System A trained model system for turning off a sleep mode of a computer based on voice data according to another exemplary embodiment of the present disclosure will be described.

The description of the electronic device specific function performing system 1 based on the artificial intelligence network described above in FIG. 1A may be applied to the trained model system for turning off a sleep mode of a computer based on the voice data according to another exemplary embodiment of the present disclosure in the same/similar way.

For example, the trained model system for turning off a sleep mode of a computer based on the voice data according to another exemplary embodiment of the present disclosure uses the voice data as the sensing data BS, uses the computer as the electronic device 3 and uses data for determining whether to turn off the sleep mode of the computer as the determination data of performing specific function BD.

The machine learning device 2 may generate the trained model 220' by repeatedly performing the process of inputting the voice data into the nodes 221 of the input layer and outputting the data for determining whether to turn off the sleep mode of the computer from the nodes 223 of the output layer, based on the artificial neural network model 220.

The electronic device 3 inputs the voice data to the AI recognition model 322 in which the trained model 220' is embedded to output the data for determining whether to turn off the sleep mode of the computer from the AI recognition model 322.

It is advantageous in that the voice data is inputted to the AI recognition model 322 to quickly and precisely output the data for determining whether to turn off the sleep mode of the computer.

Further, it is advantageous in that the AI recognition model 322 which is trained in advance is used so that separate learning is not performed whenever the real time voice data is inputted, but the data for determining whether to turn off the sleep mode of the computer may be automatically quickly output so that the convenience of the user may be promoted.

It is advantageous in that the power is not always turned on, but the system is driven only when sensing data is received so that the power consumption may be reduced.

2-2-1 Trained Model Creation Method for Turning Off Computer Sleep Mode

The above description of Example 1-1-1 may be applied to a trained model creation method for turning off a sleep mode of a computer according to another exemplary embodiment of the present disclosure in the same/similar way.

For example, according to the trained model creation method for turning off a sleep mode of a computer based on the voice data according to another exemplary embodiment of the present disclosure, the voice data is used as the sensing data BS, the computer is used as the electronic device 3 and data for turning off a computer sleep mode is used as the determination data of performing specific function BD.

The machine learning device 2 may generate the trained model 220' by repeatedly performing the process of inputting the voice data into the nodes 221 of the input layer and outputting the data for turning off the computer sleep mode from the nodes 223 of the output layer, based on the artificial neural network model 220.

2-2-2 Trained Model for Turning Off Computer Sleep Mode

The above description of Example 1-1-2 may be applied to a trained model for turning off a computer sleep mode according to another exemplary embodiment of the present disclosure in the same/similar way.

For example, the trained model for turning off a computer sleep mode based on the voice data according to another exemplary embodiment of the present disclosure may be created from the artificial neural network model 220 using the voice data as the sensing data BS, using the computer as the electronic device 3 and using data for turning off a computer sleep mode as the determination data of performing specific function BD.

Specifically, the machine learning device 2 may generate the trained model 220' by repeatedly performing the process of inputting the voice data into the nodes 221 of the input layer and outputting the data for turning off the computer sleep mode from the nodes 223 of the output layer, based on the artificial neural network model 220.

2-2-3 Dedicated Chip for Turning Off Computer Sleep Mode

The above description of Example 1-1-3 may be applied to a dedicated chip for turning off a computer sleep mode according to another exemplary embodiment of the present disclosure in the same/similar way.

For example, in the dedicated chip for turning off a computer sleep mode according to another exemplary embodiment of the present disclosure, the determination data of performing specific function is data for determining whether to turn off the computer sleep mode in response to the input of the voice data to the computer and the machine learning of the artificial neural network model 220 is to repeatedly perform the process of inputting the voice data into the nodes 221 of the input layer and outputting data for determining whether to turn off the computer sleep mode from the nodes 223 of the output layer, and the trained model 220' created as the result of repeated performance may be embedded in the dedicated chip for turning off a computer sleep mode as an AI recognition model 322'.

2-2-4 Computer with Sleep Mode Turning-Off Function Using Artificial Neural Network The above description of Example 1-1-5 may be applied to a computer having a sleep mode turning off function using an artificial neural network according to another exemplary embodiment of the present disclosure in the same/similar way.

For example, the determination data of performing specific function is data for determining whether to turn off the computer sleep mode in response to the input of the voice data to the computer and the machine learning of the artificial neural network model 220 is to repeatedly perform the process of inputting the voice data into the nodes 221 of the input layer and outputting data for determining whether to turn off the computer sleep mode from the nodes 223 of the output layer, and the trained model 220' created as the result of repeated performance may be embedded in the computer as an AI recognition model 322'.

2-2-5 System for Turning Off Sleep Mode of Computer Using Artificial Neural Network (Server-Client Model)

The above description of Example 1-1-6 may be applied to a system for turning off a sleep mode of a computer using an artificial neural network according to another exemplary embodiment of the present disclosure in the same/similar way.

For example, the determination data of performing specific function is data for determining whether to turn off the sleep mode of the computer in response to the input of the voice data to the computer and the machine learning of the artificial neural network model 220 is to repeatedly perform the process of inputting the voice data into the nodes 221 of the input layer and outputting data for determining whether to turn off the sleep mode of the computer from the nodes 223 of the output layer, and the trained model 220' created as the result of repeated performance may be embedded in the server 5 as an AI recognition model 322'.

Modified Example 2-2-6 System for Booting Computer Based on Voice Information Using Artificial Neural Network The above description of Example 2-2 may be applied to the system for booting a computer based on voice information using an artificial neural network in the same/similar way. However, as the determination data of performing specific function, data for determining whether to boot the computer may be used rather than computer sleep mode off determination data.

Modified Example 2-2-7 Specific Function Performing System of TV Based on Voice Information Using Artificial Neural Network The above description of Example 2-2 may be applied to the system for performing a specific function of a TV based on voice information using an artificial neural network in the same/similar way. However, the TV is used as the electronic device 3 and as the determination data of performing specific function, data for determining whether to activate the TV may be used rather than the computer sleep mode off determination data.

Example 2-3 Trained Model System for Activating Specific Function (Display) of Home Appliance (TV or Refrigerator) Based on Voice Information A trained model system for turning on a display of a home appliance based on voice data according to another exemplary embodiment of the present disclosure will be described.

The description of the system 1 for performing a specific function for an electronic device based on the artificial intelligence network described above in FIG. 1A may be applied to the trained model system for turning on a display of a home appliance based on the voice data according to another exemplary embodiment of the present disclosure in the same/similar way.

For example, the trained model system for turning on a display of a home appliance based on the voice data according to another exemplary embodiment of the present disclosure uses the voice data as the sensing data BS, uses the home appliance (a TV or a refrigerator) as the electronic device 3 and uses data for determining whether to turn on the display of the home appliance as the determination data of performing specific function BD.

The machine learning device 2 may generate the trained model 220' by repeatedly performing the process of inputting the voice data into the nodes 221 of the input layer and outputting the data for determining whether to turn on the display of the home appliance from the nodes 223 of the output layer, based on the artificial neural network model 220.

The electronic device 3 inputs the voice data to the AI recognition model 322 in which the trained model 220' is embedded to output the data for determining whether to turn on the display of the home appliance from the AI recognition model 322.

The voice data is inputted to the AI recognition model 322 to quickly and precisely output the data for determining whether to turn on the display.

Further, it is advantageous in that the AI recognition model 322 which is trained in advance is used so that separate learning is not performed whenever the real time voice data is inputted, but the data for determining whether to turn on the display may be automatically quickly output so that the convenience of the user may be promoted.

It is advantageous in that the power is not always turned on, but the system is driven only when sensing data is received so that the power consumption may be reduced.

2-3-1 Trained Model Creation Method for Activating Display of Home Appliance

The above description of Example 1-1-1 may be applied to a trained model creation method for turning on a display of a home appliance according to another exemplary embodiment of the present disclosure in the same/similar way.

For example, according to the trained model creation method for turning on a display of a home appliance based on the voice data according to another exemplary embodiment of the present disclosure, the voice data is used as the sensing data BS, the home appliance is used as the electronic device 3 and data for determining whether to turn on the display of the home appliance is used as the determination data of performing specific function BD.

The machine learning device 2 may generate the trained model 220' by repeatedly performing the process of inputting the voice data into the nodes 221 of the input layer and outputting the data for determining whether to turn on the display of the home appliance from the nodes 223 of the output layer, based on the artificial neural network model 220.

2-3-2 Trained Model for Activating Display of Home Appliance

The above description of Example 1-1-2 may be applied to a trained model for turning on a display of a home appliance according to another exemplary embodiment of the present disclosure in the same/similar way.

For example, the trained model for turning on a display of a home appliance according to another exemplary embodiment of the present disclosure may be created from the artificial neural network model 220 using the voice data as the sensing data BS, using the home appliance as the electronic device 3 and using data for determining whether to turn on a display of a home appliance as the determination data of performing specific function BD.

Specifically, the machine learning device 2 may generate the trained model 220' by repeatedly performing the process of inputting the voice data into the nodes 221 of the input layer and outputting the data for determining whether to turn on the display of the home appliance from the nodes 223 of the output layer, based on the artificial neural network model 220.

2-3-3 Dedicated Chip for Activating Display of Home Appliance

The above description of Example 1-1-3 may be applied to a dedicated chip for turning on a display of a home appliance according to another exemplary embodiment of the present disclosure in the same/similar way.

For example, in the dedicated chip for turning on a display of a home appliance according to another exemplary embodiment of the present disclosure, the determination data of performing specific function is data for determining whether to turn on the display of the home appliance in response to the input of the voice data to the home appliance and the machine learning of the artificial neural network model 220 is to repeatedly perform the process of inputting the voice data into the nodes 221 of the input layer and outputting data for determining whether to turn on the display of the home appliance from the nodes 223 of the output layer, and the trained model 220' created as the result of repeated performance may be embedded in the dedicated chip for turning on the display of the home appliance as an AI recognition model 322'.

2-3-4 Home Appliance with Display Activating Function Using Artificial Neural Network The above description of Example 1-1-5 may be applied to a home appliance having a display turning-on function using an artificial neural network according to another exemplary embodiment of the present disclosure in the same/similar way.

For example, the determination data of performing specific function is data for determining whether to turn on the display of the home appliance in response to the input of the voice data to the home appliance and the machine learning of the artificial neural network model 220 is to repeatedly perform the process of inputting the voice data into the nodes 221 of the input layer and outputting data for determining whether to turn on the display of the home appliance from the nodes 223 of the output layer, and the trained model 220' created as the result of repeated performance may be embedded in the home appliance as an AI recognition model 322'.

2-3-5 System for Activating Display of Home Appliance Using Artificial Neural Network (Server-Client Model)

The above description of Example 1-1-6 may be applied to a system for activating a display of a home appliance using an artificial neural network according to another exemplary embodiment of the present disclosure in the same/similar way.

For example, the determination data of performing specific function is data for determining whether to turn on the display of the home appliance in response to the input of the voice data to the home appliance and the machine learning of the artificial neural network model 220 is to repeatedly perform the process of inputting the voice data into the nodes 221 of the input layer and outputting data for determining whether to turn on the display of the home appliance from the nodes 223 of the output layer, and the trained model 220' created as the result of repeated performance may be embedded in the server 5 as an AI recognition model 322'.

Example 2-4 Trained Model System for Unlocking Vehicle Based on Voice Information A trained model system for unlocking a vehicle based on voice data according to another exemplary embodiment of the present disclosure will be described.

The description of the system 1 for performing a specific function for an electronic device based on the artificial intelligence network described above in FIG. 1A may be applied to the trained model system for unlocking a vehicle based on the voice data according to another exemplary embodiment of the present disclosure in the same/similar way.

For example, the trained model system for unlocking the vehicle based on the voice data according to another exemplary embodiment of the present disclosure uses the voice data as the sensing data BS, uses the vehicle as the electronic device 3 and uses data for determining whether the vehicle is unlocked as the determination data of performing specific function BD.

The machine learning device 2 may generate the trained model 220' by repeatedly performing the process of inputting the voice data into the nodes 221 of the input layer and outputting the data for determining whether the vehicle is unlocked from the nodes 223 of the output layer based on the artificial neural network model 220.

The electronic device 3 inputs the voice data to the AI recognition model 322 in which the trained model 220' is embedded to output data for determining whether the vehicle is unlocked from the AI recognition model 322.

It is advantageous in that the voice data is inputted to the AI recognition model 322 to quickly and precisely output the data for determining whether the vehicle is unlocked.

Further, it is advantageous in that the AI recognition model 322 which is trained in advance is used so that separate learning is not performed whenever the real time voice data is inputted, but the data for determining whether the vehicle is unlocked may be automatically quickly output so that the convenience of the user may be promoted.

2-4-1 Trained Model Creation Method for Unlocking Vehicle

The above description of Example 1-1-1 may be applied to a trained model creation method for unlocking a vehicle according to another exemplary embodiment of the present disclosure in the same/similar way.

For example, according to the trained model creation method for unlocking the vehicle based on the voice data according to another exemplary embodiment of the present disclosure, the voice data is used as the sensing data BS, the vehicle is used as the electronic device 3 and data for determining whether the vehicle is unlocked is used as the determination data of performing specific function BD.

The machine learning device 2 may generate the trained model 220' by repeatedly performing the process of inputting the voice data into the nodes 221 of the input layer and outputting the data for determining whether the vehicle is unlocked from the nodes 223 of the output layer based on the artificial neural network model 220.

2-4-2 Trained Model for Unlocking Vehicle

The above description of Example 1-1-2 may be applied to a trained model for unlocking a vehicle according to another exemplary embodiment of the present disclosure in the same/similar way.

For example, the trained model for unlocking a vehicle based on the voice data according to another exemplary embodiment of the present disclosure may be created from the artificial neural network model 220 using the voice data as the sensing data BS, using the vehicle as the electronic device 3 and using data for determining whether the vehicle is unlocked as the determination data of performing specific function BD.

Specifically, the machine learning device 2 may generate the trained model 220' by repeatedly performing the process of inputting the voice data into the nodes 221 of the input layer and outputting the data for determining whether the vehicle is unlocked from the nodes 223 of the output layer, based on the artificial neural network model 220.

2-4-3 Dedicated Chip for Unlocking Vehicle

The above description of Example 1-1-3 may be applied to a dedicated chip for determining whether the vehicle is unlocked according to another exemplary embodiment of the present disclosure in the same/similar way.

For example, in the dedicated chip for determining whether the vehicle is unlocked according to another exemplary embodiment of the present disclosure, the determination data of performing specific function is data for determining whether the vehicle is unlocked in response to the input of the voice data to the vehicle and the machine learning of the artificial neural network model 220 is to repeatedly perform the process of inputting the voice data into the nodes 221 of the input layer and outputting data for determining whether the vehicle is unlocked from the nodes 223 of the output layer, and the trained model 220' created as the result of repeated performance may be embedded in the dedicated chip for determining whether the vehicle is unlocked as an AI recognition model 322'.

2-4-4 Vehicle with Unlocking Function Using Artificial Neural Network

The above description of Example 1-1-5 may be applied to a vehicle having an unlocking function using an artificial neural network according to another exemplary embodiment of the present disclosure in the same/similar way.

For example, the determination data of performing specific function is data for determining whether the vehicle is unlocked in response to the input of the voice data to the vehicle and the machine learning of the artificial neural network model 220 is to repeatedly perform the process of inputting the voice data into the nodes 221 of the input layer and outputting data for determining whether the vehicle is unlocked from the nodes 223 of the output layer, and the trained model 220' created as the result of repeated performance may be embedded in the vehicle as an AI recognition model 322'.

2-4-5 System for Unlocking Vehicle Using Artificial Neural Network (Server-Client Model)

The above description of Example 1-1-6 may be applied to a system for unlocking a vehicle using an artificial neural network according to another exemplary embodiment of the present disclosure in the same/similar way.

For example, the determination data of performing specific function is data for determining whether the vehicle is unlocked in response to the input of the voice data to the vehicle and the machine learning of the artificial neural network model 220 is to repeatedly perform the process of inputting the voice data into the nodes 221 of the input layer and outputting data for determining whether the vehicle is unlocked from the nodes 223 of the output layer, and the trained model 220' created as the result of repeated performance may be embedded in the server 5 as an AI recognition model 322'.

Modified Example 2-4-6 System for Starting Engine of a Vehicle Based on Voice Information Using Artificial Neural Network The above description of Example 2-4 may be applied to the system for starting an engine of a vehicle based on voice information using an artificial neural network in the same/similar way. However, as the determination data of performing specific function, data for determining whether the engine of the vehicle is started may be used rather than the data for determining whether the vehicle is unlocked.

Embodiment 3 (Electronic Device which Performs Specific Function Based on Human Proximity Information)

Hereinafter, a system for performing a specific function of an electronic device 3 based on human proximity information according to another exemplary embodiment of the present disclosure will be described.

Example 3-1 Trained Model System for Unlocking Smart Phone Based on Sensing Data of Infrared Sensing Sensor Specifically, a trained model system for unlocking a locked smart phone based on sensing data of an infrared sensing sensor according to another exemplary embodiment of the present disclosure will be described.

The above description of the system 1 for performing a specific function for an electronic device based on the artificial intelligence network described above in FIG. 1A may be applied to the trained model system for unlocking the locked smart phone based on the sensing data of an infrared sensing sensor according to another exemplary embodiment of the present disclosure in the same/similar way.

For example, the trained model system for unlocking the locked smart phone based on the sensing data of an infrared sensing sensor according to another exemplary embodiment of the present disclosure uses the sensing data of an infrared sensing sensor as the sensing data BS, uses the smart phone as the electronic device 3 and uses data for determining whether the smart phone is unlocked as the determination data of performing specific function BD.

The machine learning device 2 may generate the trained model 220' by repeatedly performing the process of inputting the sensing data of an infrared sensing sensor into the nodes 221 of the input layer and outputting the data for determining whether the smart phone is unlocked from the nodes 223 of the output layer based on the artificial neural network model 220.

The electronic device 3 inputs the sensing data of an infrared sensing sensor to the AI recognition model 322 in which the trained model 220' is embedded to output the smart phone unlock determination data from the AI recognition model 322. The locked smart phone may be unlocked based on the signal to perform a specific function generated from the output smart phone unlock determination data.

The sensing data of an infrared sensing sensor is inputted to the AI recognition model 322 to quickly and precisely output the smart phone unlock determination data.

Further, it is advantageous in that the AI recognition model 322 which is trained in advance is used so that separate learning is not performed whenever the real time sensing data of an infrared sensing sensor is inputted, but the data for determining whether the smart phone is unlocked may be automatically quickly output so that the convenience of the user may be promoted.

It is advantageous in that the power is not always turned on, but the system is driven only when sensing data is received so that the power consumption may be reduced.

Example 3-2 Trained Model System for Turning Off Computer Sleep Mode Based on Sensing Data of Infrared Sensing Sensor According to a trained model system for turning off a computer sleep mode based on sensing data of an infrared sensing sensor according to another exemplary embodiment of the present disclosure, the description of Example 3-1 may be applied in the same/similar way. However, the computer is used as the electronic device 3 and computer sleep mode off determination data is used as determination data of performing specific function.

Modified Example 3-2-6 System of Booting Computer Based on Sensing Data of Infrared Sensing Sensor Using Artificial Neural Network According to the system of booting a computer based on sensing data of an infrared sensing sensor using an artificial neural network, the above description of Example 3-2 may be applied in the same/similar way. However, computer booting determination data may be used as the determination data of performing specific function.

Modified Example 3-2-7 System for Performing Specific Function of TV Based on Sensing Data of Infrared Sensing Sensor Using Artificial Neural Network According to the system for performing a specific function of TV based on sensing data of an infrared sensing sensor using an artificial neural network, the above description of Example 3-2 may be applied in the same/similar way. However, the TV is used as the electronic device 3 and TV activation determination data is used as determination data of performing specific function.

Example 3-3 Trained Model System for Activating Specific Function (Display) of Home Appliance (TV or Refrigerator) Based on Sensing Data of Infrared Sensing Sensor According to a trained model system for activating display-on of a home appliance based on sensing data of an infrared sensing sensor according to another exemplary embodiment of the present disclosure, the above description of Example 3-2 may be applied in the same/similar way. However, the home appliance is used as the electronic device 3 and display-on determination data is used as the determination data of performing specific function.

Example 3-4 Trained Model System for Unlocking Vehicle Based on Sensing Data of Infrared Sensing Sensor According to another exemplary embodiment of the present disclosure, the above description of Example 3-2 may be applied in the same/similar way. However, the vehicle is used as the electronic device 3 and vehicle unlock determination data is used as the determination data of performing specific function.

Modified Example 3-4-6 System for Starting Engine of Vehicle Based on Sensing Data of Infrared Sensing Sensor Using Artificial Neural Network According to a system for starting an engine of a vehicle based on sensing data of an infrared sensing sensor according to another exemplary embodiment of the present disclosure, the above description of Example 3-4 may be applied in the same/similar way. However, the vehicle engine start-up data may be used as the determination data of performing specific function.

Embodiment 4 (Electronic Device which Performs Specific Function Based on Image Information)

Hereinafter, a system for performing a specific function for an electronic device 3 based on image information according to another exemplary embodiment of the present disclosure will be described.

Example 4-1 Trained Model System for Unlocking Smart Phone Based on Sensing Data of Image Sensor Specifically, a trained model system for unlocking a locked smart phone based on image data according to another exemplary embodiment of the present disclosure will be described.

The above description of the system 1 for performing a specific function for an electronic device based on the artificial intelligence network described above in FIG. 1A may be applied to the trained model system for unlocking the locked smart phone based on the image data according to another exemplary embodiment of the present disclosure in the same/similar way.

For example, the trained model system for unlocking the locked smart phone based on the image data according to another exemplary embodiment of the present disclosure uses the image data as the sensing data BS, uses the smart phone as the electronic device 3 and uses data for determining whether the smart phone is unlocked as the determination data of performing specific function BD. The image data may be data acquired from an image sensor such as a camera.

The machine learning device 2 may generate the trained model 220' by repeatedly performing the process of inputting the image data into the nodes 221 of the input layer and outputting the data for determining whether the smart phone is unlocked from the nodes 223 of the output layer, based on the artificial neural network model 220.

The electronic device 3 inputs the image data to the AI recognition model 322 in which the trained model 220' is embedded to output smart phone unlock determination data from the AI recognition model 322. The locked smart phone may be unlocked based on the signal to perform a specific function generated from the output smart phone unlock determination data.

It is advantageous in that the image data is inputted to the AI recognition model 322 to quickly and precisely output the smart phone unlock determination data.

Further, it is advantageous in that the AI recognition model 322 which is trained in advance is used so that separate learning is not performed whenever the real time image data is inputted, but the smart phone unlock determination data may be automatically quickly output so that the convenience of the user may be promoted.

It is advantageous in that the power is not always turned on, but the system is driven only when sensing data is received so that the power consumption may be reduced.

Modified Example 4-1 Trained Model System for Activating Camera of Smart Phone Based on Sensing Data of Image Sensor According to a trained model system for activating a camera of a smart phone based on image data according to another exemplary embodiment of the present disclosure, the above description of Example 4-1 may be applied in the same/similar way. However, smart phone camera activation determination data may be used as the determination data of performing specific function.

Example 4-2 Trained Model System for Turning Off Computer Sleep Mode Based on Sensing Data of Image Sensor According to a trained model system for turning off a computer sleep mode based on image data according to another exemplary embodiment of the present disclosure, the description of Example 4-1 may be applied in the same/similar way. However, the computer is used as the electronic device 3 and computer sleep mode off determination data is used as determination data of performing specific function.

Modified Example 4-2-6 System of Booting Computer Based on Sensing Data of Image Sensor Using Artificial Neural Network According to another exemplary embodiment of the present disclosure, the above description of Example 4-2 may be applied in the same/similar way. However, computer booting determination data may be used as determination data of performing specific function.

Modified Example 4-2-7 System for Performing Specific Function of TV Based on Sensing Data of Image Sensor Using Artificial Neural Network According to a system for performing a specific function of a TV based on image data using an artificial neural network according to another exemplary embodiment of the present disclosure, the above description of Example 4-2 may be applied in the same/similar way. However, the TV is used as the electronic device 3 and TV activation determination data is used as determination data of performing specific function.

Example 4-3 Trained Model System for Activating Specific Function (Display) of Home Appliance (TV or Refrigerator) Based on Sensing Data of Image Sensor According to a trained model system for activating display on of a home appliance based on image data using an artificial neural network according to another exemplary embodiment of the present disclosure, the above description of Example 4-1 may be applied in the same/similar way.

However, the home appliance (for example, a TV or a refrigerator) is used as the electronic device 3 and display on determination data is used as determination data of performing specific function.

Example 4-4 Trained Model System for Unlocking Vehicle Based on Sensing Data of Image Sensor According to a trained model system for unlocking a vehicle based on image data using an artificial neural network according to another exemplary embodiment of the present disclosure, the above description of Example 4-1 may be applied in the same/similar way. However, the vehicle is used as the electronic device 3 and vehicle unlock determination data is used as determination data of performing specific function.

Modified Example 4-4-6 System for Starting Engine of Vehicle Based on Sensing Data of Image Sensor Using Artificial Neural Network According to a trained model system for starting an engine of a vehicle based on image data using an artificial neural network according to another exemplary embodiment of the present disclosure, the above description of Example 4-4 may be applied in the same/similar way. However, vehicle engine start-up determination data is used as determination data of performing specific function.

Additional Example—when Electronic Device is Vehicle, Specific Function of Vehicle with Respect to Input of Voice Data is Performed In the case of the additional Example, the above description of Example 2-4 (trained model system for unlocking vehicle based on voice information) may be applied in the same/similar way. Among them, specifically, the description of 2-4-4 (the vehicle having an unlocking function using an artificial neural network) may be applied in the same/similar way.

For example, the determination data of performing specific function is data for determining whether a rear window heater in the vehicle is operated in response to the input of the voice data to the vehicle and the machine learning of the artificial neural network model is to repeatedly perform a process of inputting the voice data into the nodes of the input layer and outputting data for determining whether the rear window heater is operated from the nodes of the output layer.

Further, the determination data of performing specific function is data for determining whether a front window defrosting function in the vehicle is operated in response to the input of the voice data to the vehicle and the machine learning of the artificial neural network model is to repeatedly perform a process of inputting the voice data into the nodes of the input layer and outputting data for determining whether the front window defrosting function is operated from the nodes of the output layer.

Further, the determination data of performing specific function is data for determining whether an air conditioner or a heater in the vehicle is operated in response to the input of the voice data to the vehicle and the machine learning of the artificial neural network model is to repeatedly perform a process of inputting the voice data into the nodes of the input layer and outputting data for determining whether the air conditioner or the heater is operated from the nodes of the output layer.

Further, the determination data of performing specific function is data for determining whether a wiper in the vehicle is operated in response to the input of the voice data to the vehicle and the machine learning of the artificial neural network model is to repeatedly perform a process of inputting the voice data into the nodes of the input layer and outputting data for determining whether the wiper is operated from the nodes of the output layer.

Further, the determination data of performing specific function is data for determining whether an illumination device in the vehicle is operated in response to the input of the voice data to the vehicle and the machine learning of the artificial neural network model is to repeatedly perform a process of inputting the voice data into the nodes of the input layer and outputting data for determining whether the illumination device is operated from the nodes of the output layer.

The illumination device in the vehicle of the present disclosure may include an emergency light, a high beam, and a head light, but the scope of the present disclosure is not limited thereto.

Further, the determination data of performing specific function is data for determining whether an AVN device in the vehicle is operated in response to the input of the voice data to the vehicle and the machine learning of the artificial neural network model is to repeatedly perform a process of inputting the voice data into the nodes of the input layer and outputting data for determining whether the AVN device is operated from the nodes of the output layer. Depending on an exemplary embodiment, data for determining whether the AVN device is controlled (for example, volume control) may be used as the determination data of performing specific function.

Further, the determination data of performing specific function is data for determining whether a voice assistant call function in the vehicle is operated in response to the input of the voice data to the vehicle and the machine learning of the artificial neural network model is to repeatedly perform a process of inputting the voice data into the nodes of the input layer and outputting data for determining whether the voice assistant call function is operated from the nodes of the output layer.

Further, the determination data of performing specific function is data for determining whether a driving mode of the vehicle is changed in response to the input of the voice data to the vehicle and the machine learning of the artificial neural network model is to repeatedly perform a process of inputting the voice data into the nodes of the input layer and outputting the data for determining whether the driving mode is changed from the nodes of the output layer.

Further, the determination data of performing specific function is data for determining whether a driving mode of the vehicle is changed in response to the input of the voice data to the vehicle and the machine learning of the artificial neural network model is to repeatedly perform a process of inputting the voice data into the nodes of the input layer and outputting the data for determining whether the driving mode is changed from the nodes of the output layer.

Further, the determination data of performing specific function is data for determining whether to shift the gear of the vehicle in response to the input of the voice data to the vehicle and the machine learning of the artificial neural network model is to repeatedly perform a process of inputting the voice data into the nodes of the input layer and outputting the data for determining whether to shift the gear from the nodes of the output layer.

However, the scope of the present disclosure is not limited to the performing specific function in the vehicle as described above, but includes all types of specific functions which may be performed in the vehicle based on the voice command.

The features, structures, effects and the like described in the foregoing embodiments are included in one embodiment of the present disclosure and are not necessarily limited to one embodiment. Moreover, the features, structures, effects and the like illustrated in each embodiment may be combined or modified by those skilled in the art for the other embodiments to be carried out. Therefore, the combination and the modification of the present disclosure are interpreted to be included within the scope of the present disclosure.

In the above description, the present disclosure has been described based on the exemplary embodiment, but the exemplary embodiments are for illustrative, and do not limit the present disclosure, and those skilled in the art will appreciate that various modifications and applications, which are not exemplified in the above description, may be made without departing from the scope of the essential characteristic of the present exemplary embodiments. For example, each component described in detail in the embodiment can be modified. Further, the differences related to the modification and the application should be construed as being included in the scope of the present disclosure defined in the accompanying claims.

According to an exemplary embodiment of the present disclosure, sensing data is precisely understood to perform a specific function in an exact situation intended by a user.

Further, the sensing data is inputted to an AI recognition model to output faster and more precise determination data of performing specific function.

Further, the convenience of users may be promoted only by performing an inference process by means of an AI recognition model without performing a separate learning whenever real-time sensing data is inputted using a previously trained AI recognition model to output determination data of performing specific function.

Finally, the power is not always turned on, but the system is driven only when specific sensing data is reduced so that the power consumption may be reduced.

What is claimed is:

1. An electronic device for performing a specific function according to a trained model created by a machine learning device performing machine learning on an artificial neural network model to generate the trained model, the electronic device comprising:

a sensing data generation unit configured to generate at least one sensing data;
a dedicated artificial intelligence (AI) acceleration processor configured to
  generate wake-up data based on the at least one sensing data using the trained model,
  wherein the trained model is embedded in the dedicated AI acceleration processor and is configured to output determination data of performing the specific function, the determination data including the wake-up data to switch from a first mode to a second mode using the at least one sensing data as input to the dedicated AI acceleration processor during the first mode, wherein the first mode is one of a stop mode, a sleep mode, or a lock mode of the electronic device, and wherein the second mode is one of a booting mode, an activation mode, or an unlock mode of the electronic device;
a control unit configured to generate a control command based on the wake-up data;
a second function unit including an output unit and a driver, the output unit including a display, the driver being driven based on the control command; and
a power source unit configured to
  supply power to the sensing data generation unit and the dedicated AI acceleration processor while supplying no power to the control unit and supplying no power to the second function unit during the first mode, and
  supply power to the control unit and the second function unit during the second mode.

2. The electronic device of claim 1,
wherein the electronic device is a home appliance including the display of the second function unit, and
wherein the wake-up data includes data to turn on the display.

3. The electronic device of claim 1,
wherein the electronic device is a vehicle, and
wherein the wake-up data includes data to start an engine of the vehicle.

4. The electronic device of claim 1,
wherein the trained model is generated using the artificial neural network model,
wherein the artificial neural network model includes
  nodes of an input layer through which voice data or image data is inputted,
  nodes of an output layer through which the determination data of performing the specific function is outputted, and
  association parameters between the nodes of the input layer and the nodes of the output layer,
wherein the artificial neural network model outputs the determination data of performing the specific function from the nodes of the output layer in response to an input of the at least one sensing data for the nodes of the input layer, and
wherein the association parameters are updated to train the artificial neural network model by repeatedly performing a process of
  inputting sensing data included in big data into the nodes of the input layer and
  outputting determination data of performing the specific function included in the big data that pairs with the sensing data included in the big data from the nodes of the output layer.

5. The electronic device of claim 1,
wherein the electronic device is a vehicle, and
wherein the determination data of performing the specific function includes data for determining one of
  rear window heater operation in the vehicle,
  front window defroster operation in the vehicle,
  air conditioner or heater operation in the vehicle,
  wiper operation in the vehicle,
  lights operation in the vehicle,
  audio, visual, and navigation (AVN) device operation in the vehicle, and
  voice assistant call operation in the vehicle.

6. The electronic device of claim 1, further comprising:
a first function unit that is an always-on module turned on even when the electronic device is turned off.

7. The electronic device of claim 6, wherein the first function unit includes a communication unit.

8. The electronic device of claim 6,
wherein the first function unit is turned on, and
wherein the second function unit is turned off to reduce power consumption and then is turned on when the control command is received from the control unit.

9. A specific function performing processor embeddable in an electronic device for performing a specific function according to a trained model created by a machine learning device performing machine learning on an artificial neural network model to generate the trained model, the specific function performing processor comprising:
a dedicated artificial intelligence (AI) acceleration processor configured to
  generate wake-up data for generating a control command in a control unit based on sensing data generated by a sensing data generator, using the trained model,
  wherein the trained model is embedded in the dedicated AI acceleration processor and is configured to output determination data of performing the specific function, the determination data including the wake-up data to switch from a first mode to a second mode using the sensing data as input to the dedicated AI acceleration processor during the first mode, wherein the first mode is one of a stop mode, a sleep mode, or a lock mode of the electronic device, and wherein the second mode is one of a booting mode, an activation mode, or an unlock mode of the electronic device,
wherein power is supplied to the sensing data generation unit and the dedicated AI acceleration processor while no power is supplied to the control unit during the first mode, and
wherein the power is supplied to the control unit during the second mode.

10. The specific function performing processor of claim 9,
wherein the trained model is generated using the artificial neural network model,
wherein the artificial neural network model includes
  nodes of an input layer through which voice data or image data is inputted,
  nodes of an output layer through which the determination data of performing the specific function is outputted, and
  association parameters between the nodes of the input layer and the nodes of the output layer,
wherein the artificial neural network model outputs the determination data of performing the specific function from the nodes of the output layer in response to an input of the at least one sensing data for the nodes of the input layer, and wherein the association parameters are updated to train the artificial neural network model by repeatedly performing a process of
inputting sensing data included in big data into the nodes of the input layer and
outputting determination data of performing the specific function included in the big data that pairs with the sensing data included in the big data from the nodes of the output layer.

* * * * *